US010462535B2

(12) United States Patent
Carter et al.

(10) Patent No.: US 10,462,535 B2
(45) Date of Patent: *Oct. 29, 2019

(54) INTERACTIVE VIDEO VIEWING

(71) Applicant: Bottle Rocket LLC, Addison, TX (US)

(72) Inventors: Calvin Carter, Dallas, TX (US); Jason Osburn, Plano, TX (US); Scott Maddux, San Francisco, CA (US); Chris Roche, Rockwall, TX (US)

(73) Assignee: Bottle Rocket LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,123

(22) Filed: May 25, 2018

(65) Prior Publication Data
US 2018/0279012 A1 Sep. 27, 2018

Related U.S. Application Data

(63) Continuation of application No. 14/329,877, filed on Jul. 11, 2014, now Pat. No. 9,986,307.
(Continued)

(51) Int. Cl.
H04N 21/4722 (2011.01)
H04N 21/235 (2011.01)
(Continued)

(52) U.S. Cl.
CPC ....... H04N 21/8173 (2013.01); H04N 21/235 (2013.01); H04N 21/41407 (2013.01);
(Continued)

(58) Field of Classification Search
CPC ............ H04N 21/8173; H04N 21/235; H04N 21/41407; H04N 21/4622; H04N 21/4722;
(Continued)

(56) References Cited

U.S. PATENT DOCUMENTS 8,763,029 B1 * 6/2014 Haberman ....... H04N 21/25435
725/32
8,819,726 B2 8/2014 Wetzer et al.
(Continued)

OTHER PUBLICATIONS

Mei, Tao et al., "VideoSense: A contextual In-Video Advertising System", Dec. 2009, IEEE Transactions on Circuits and Systems for Video Technology, vol. 19, No. 12, 1866-1879.

Primary Examiner — Nathan J Flynn
Assistant Examiner — Caroline Somera
(74) Attorney, Agent, or Firm — Perkins Coie LLP

(57) ABSTRACT

A method and apparatus for providing an interactive video viewing experience for a user. The user has an internet enabled device and launches an interactive watching application (IWA) on his device. Using the IWA, he brings up a list of available video content and selects a video for viewing. As the user is viewing the video, an overlay display appears on the lower portion of the screen and overlays a portion of the still running video. The overlay displays "Touch for information regarding this program." When the user touches the display, the video pauses and a web page containing information regarding or relating to the program or its subject matter is displayed. Utilizing various similar overlays, an interactive video viewing experience is provided to the user. The experience can include various overlays and associated experiences, such as obtaining information regarding new characters or consumer products as they appear.

22 Claims, 31 Drawing Sheets

Related U.S. Application Data

(60) Provisional application No. 61/856,601, filed on Jul. 19, 2013.

(51) Int. Cl.
  *H04N 21/81* (2011.01)
  *H04N 21/478* (2011.01)
  *H04N 21/414* (2011.01)
  *H04N 21/462* (2011.01)
  *H04N 21/658* (2011.01)

(52) U.S. Cl.
  CPC ..... *H04N 21/4622* (2013.01); *H04N 21/4722* (2013.01); *H04N 21/47815* (2013.01); *H04N 21/6581* (2013.01); *H04N 21/812* (2013.01)

(58) Field of Classification Search
  CPC ......... H04N 21/47815; H04N 21/6581; H04N 21/812
  USPC .......................................................... 725/42
  See application file for complete search history.

(56) References Cited

U.S. PATENT DOCUMENTS

| | | | |
|---|---|---|---|
| 2002/0035404 A1 | 3/2002 | Ficco et al. | |
| 2002/0129364 A1 | 9/2002 | Smith et al. | |
| 2002/0157101 A1* | 10/2002 | Schrader | H04N 5/4401 725/64 |
| 2007/0053513 A1 | 3/2007 | Hoffberg | |
| 2007/0154169 A1 | 7/2007 | Cordray et al. | |
| 2008/0055265 A1 | 3/2008 | Bewley et al. | |
| 2008/0083003 A1* | 4/2008 | Biniak | G11B 27/28 725/110 |
| 2008/0276269 A1 | 11/2008 | Miller et al. | |
| 2009/0006375 A1 | 1/2009 | Lax et al. | |
| 2009/0150930 A1* | 6/2009 | Sherwin | G11B 27/031 725/35 |
| 2009/0293079 A1* | 11/2009 | McKee | G06Q 10/105 725/10 |
| 2009/0313324 A1 | 12/2009 | Brooks et al. | |
| 2010/0153990 A1 | 6/2010 | Ress et al. | |
| 2010/0179878 A1 | 7/2010 | Dawson et al. | |
| 2010/0329644 A1 | 12/2010 | Rosenfeld et al. | |
| 2011/0173655 A1 | 7/2011 | Blumenschein et al. | |
| 2011/0307331 A1 | 12/2011 | Richard et al. | |
| 2012/0159541 A1 | 6/2012 | Carton et al. | |
| 2012/0185905 A1 | 7/2012 | Kelley et al. | |
| 2012/0240142 A1 | 9/2012 | Rose et al. | |
| 2012/0326993 A1 | 12/2012 | Weisman et al. | |
| 2013/0117131 A1 | 5/2013 | Robinson et al. | |
| 2013/0125177 A1 | 5/2013 | Pino et al. | |
| 2013/0152123 A1 | 6/2013 | Briggs et al. | |
| 2013/0268965 A1 | 10/2013 | Sherwin et al. | |
| 2014/0006660 A1 | 1/2014 | Frei et al. | |
| 2014/0130105 A1 | 5/2014 | Reisman | |
| 2014/0143800 A1 | 5/2014 | Arankalle et al. | |
| 2014/0195675 A1 | 7/2014 | Silver | |
| 2014/0229286 A1 | 8/2014 | Obradovich et al. | |
| 2014/0359656 A1 | 12/2014 | Banica et al. | |
| 2015/0026708 A1 | 1/2015 | Ahmed et al. | |
| 2015/0052552 A1 | 2/2015 | Pizzurro et al. | |
| 2015/0199770 A1 | 7/2015 | Wallenstein | |
| 2015/0264410 A1* | 9/2015 | Oh | H04L 65/60 725/116 |
| 2016/0029073 A1 | 1/2016 | Briggs et al. | |

* cited by examiner

INTERACTIVE VIDEO VIEWING

CROSS-REFERENCE TO RELATED APPLICATIONS

This application is a continuation of U.S. patent application Ser. No. 14/329,877, entitled "INTERACTIVE VIDEO VIEWING", filed Jul. 11, 2014, which claims the benefit of U.S. Provisional Patent Application No. 61/856,601, entitled "Modular Platform for Augmenting Video Content", which was filed on Jul. 19, 2013, which is incorporated by reference herein in their entirety.

BACKGROUND

Users watch video on various types of internet enabled devices, such as tablets, smartphones, laptops, etc. Users may access various types of video via the internet and watch the videos as they are streamed over the internet to the users' internet enabled devices. For example, a user may use his internet enabled device to locate a television (TV) program or movie that is available via video on demand (VOD), and to initiate a stream of the TV program or movie to his internet enabled device for viewing. As another example, the user may use his internet enabled device to locate an online feed of a channel of interest, such as one of the major networks (e.g., NBC, ABC, CBS, FOX, etc.), and join in viewing a feed that is broadcast 24×7 (i.e., 24 hours a day, 7 days a week).

SUMMARY

This description introduces a technique for providing an interactive video viewing experience for a user. In an embodiment, a user has an internet enabled device, such as a tablet computer or a smartphone, and launches an interactive watching application (IWA) on his internet enabled device. Using the IWA, he brings up a list of available video content, and he selects a video to view. As the user is viewing the video, an overlay display appears on the lower portion of the screen and overlays a portion of the still running video. The overlay display displays "Touch for information regarding this program." When the user touches the display of his internet enabled device, the video pauses and a web view appears of a web page containing information about the program. The user navigates around the web data, and decides that he wants to watch the video. He exits the web view, and the video resumes.

At a point in the video where a new show character or cast member appears, another overlay appears. The overlay displays information regarding this new character or cast member, and slowly fades after a few seconds. An advertiser has arranged for a product placement to appear in the video for a new soda called "Tasty." At a point in the video where the product placement occurs (i.e., where Tasty appears), another overlay appears. The overlay displays "Touch to obtain a coupon for Tasty, a fantastic new soda." The user touches the display, and a coupon for a free can of Tasty is emailed to his email account, texted to his smartphone, or added to a digital wallet.

At a point in the video where a commercial for a new show appears, another overlay appears. The overlay displays "Touch to record this new show." The user touches the display, and the IWA causes the user's DVR to schedule to record the new show. Near the end of the show, an overlay appears and displays "Touch to share your thoughts about this show with your friends." When the user touches the display, the video pauses and a social media view is loaded. The social media view enables the user to share information about the show or any other topic via one or more of his social media accounts.

At the end of the video, the user realizes that his viewing experience was enhanced by the interactive video viewing environment that he just experienced. Using this environment, he was able to obtain information about the program of the video to determine if he was interested in watching the program. As new characters or cast members appeared, information about these new characters or cast members appeared as an overlay on the screen, and he was able to keep track of the characters and/or cast members and understand the show better. As a new product appeared on the screen, he was able to obtain a coupon for the product. Finally, as the show ended, he was able to easily share his thoughts about the program with his friends via a social media application that automatically appeared.

BRIEF DESCRIPTION OF THE DRAWINGS

Embodiments of a technique will be described and explained through the use of the accompanying drawings in which.

DETAILED DESCRIPTION

This description introduces a technique for providing an interactive video viewing experience for a user. In this description, the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

In this description, references to "an embodiment," "one embodiment," "an implementation," or the like, mean that the particular feature, function, structure or characteristic being described is included in at least one embodiment of the technique introduced here. Occurrences of such phrases in this specification do not necessarily all refer to the same embodiment. On the other hand, the embodiments referred to are also not necessarily mutually exclusive.

Figure 1:
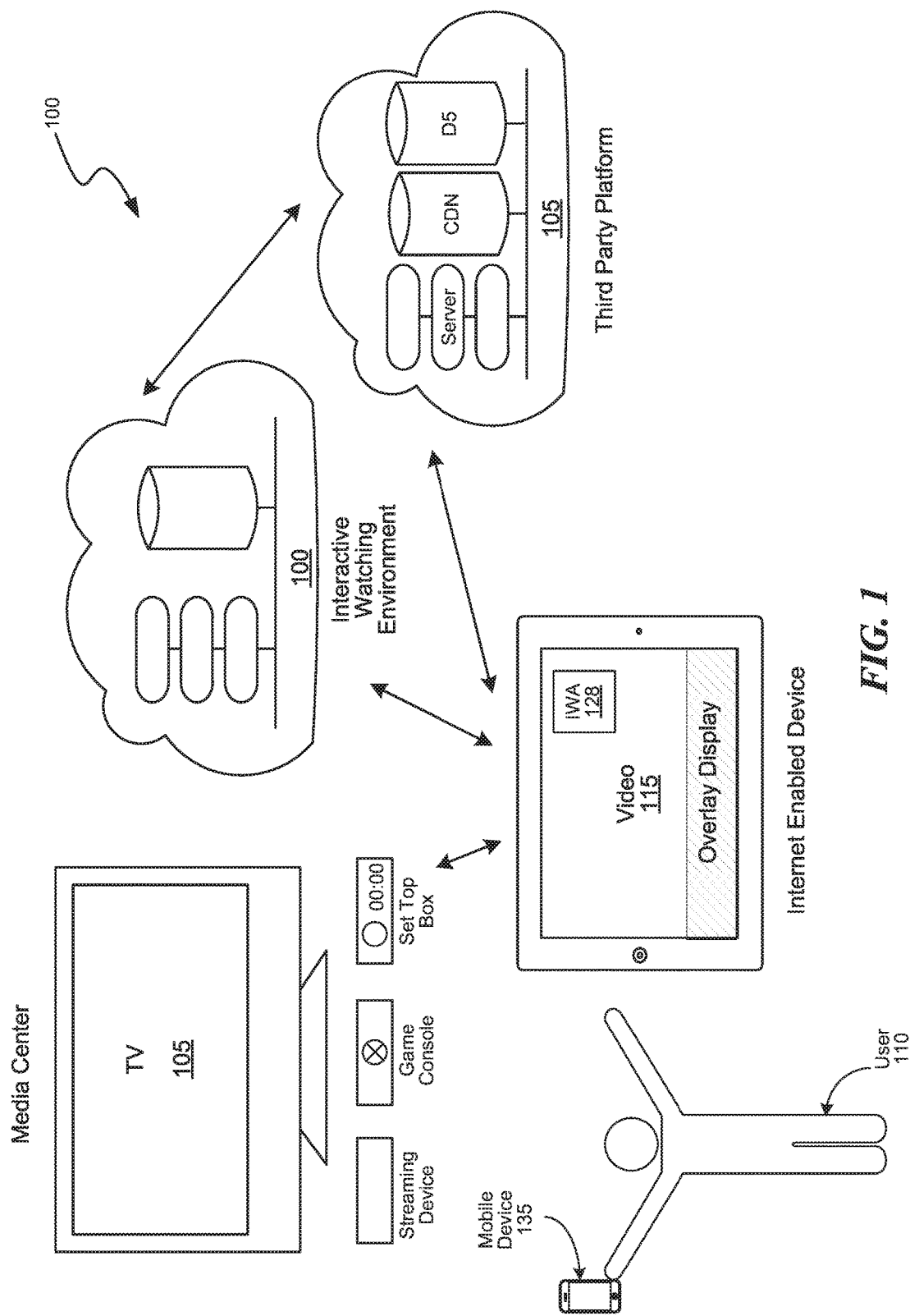
FIG. 1 is a system diagram illustrating an environment where a user can experience interactive video viewing, consistent with various embodiments.

FIG. 1 is a system diagram illustrating an environment where a user can experience interactive video viewing, consistent with various embodiments. In the embodiment of FIG. 1, environment 100 includes user 110's media center 105 and internet enabled device 115, interactive watching environment (IWE) 120, and third party platform 125. Media center 105 can include streaming devices, video game consoles, set top boxes, digital video recorders (DVRs), TVs, internet enabled blu-ray disc players, etc. Internet enabled device 115 can be a tablet computer, a smartphone, a laptop computer, etc., and can have a touch sensitive screen. The internet enabled devices that are part of environment 100 can communicate via a network, which can include local area networks, wide area networks, wireless networks, the internet, etc.

In some embodiments, a video content provider, such as a network broadcast station (e.g., NBC, ABC, etc.), or a video on demand provider (e.g., Comcast™, Netflix™, etc.), among others, uses IWE 120 to create a trigger for additional content to appear on a user's internet enabled device, such as user 110's internet enabled device 115, while streaming an associated video. A trigger can cause additional content to be displayed based on various events or data related to the video, and the additional content can be overlaid over the display of the streaming video (as is shown with the "overlay display" of internet enabled device 115).

For example, IWE 120 can serve a data feed that includes triggers. In some embodiments, the triggers can specify the begin and end time codes to display content, e.g., via an overlay display, that is related to the video or the video's contents. For example, display a specific overlay display or display element (also referred to as a display template) at 12:52 into playback, in which case the data fields of the trigger in the feed can be start time, stop time, and a pointer to the overlay display or display element to use.

Each trigger in the feed can have an associated content type, e.g., display a fact, display a photo, display a quiz, etc. The data relevant to the content type can be included in the data feed, can be interpreted by an application, e.g., interactive watching application (IWA) 130, that runs on internet enabled device 115. IWA 130 can build the related overlay display, for example, based on a display element and the data of the trigger. As the video playback progresses, IWA 130 can monitor the feed for a begin time code signaling a time to display related content, and can react to the time arriving at the begin time code by displaying the related content, e.g., via an overlay display, until the time when the end time code arrives.

For related content that is interactive, playback of the video can be paused upon a touch interaction with the overlay display (e.g., displaying a quiz). A trigger can also be a derived value, such as display a specific overlay display four times during a video. A trigger can further be based on an elapsed time, such as display a specific overlay display every ten minutes during the video. The trigger data fields for an elapsed time trigger can be the elapsed timer and a pointer to the specific overlay display or display element to use.

In some embodiments, the video content provider can create a trigger that displays additional content at a predefined point in the video (e.g., at the 5:25 point of the video), when the next or a specific commercial begins (e.g., at the next commercial break or when a Coca Cola™ commercial begins), when a specific TV show begins, when a specific character from a TV show or movie appears in the video, etc. In addition to, or alternately to, being sent to internet enabled device 115 via an IWE 120 data feed, a trigger can be stored in or added to various places related to the video, such as in the video content as meta-data, in a database associated with IWE 120, etc. When added to the database, the trigger can also be linked with the video via the database.

To use internet enabled device 115 to interactively view videos, user 110 downloads and installs IWA 130 on internet enabled device 115. User 115 can then use IWA 130 to determine available video data, such as by searching for videos or browsing a catalog of available videos. User 110 locates a video of interest and uses IWA 130 to initiate the streaming of the video to internet enabled device 110. Prior to the streaming of the video, the video content provider inserted a trigger to cause additional content to be displayed at the 5:25 point in the video. An advertiser arranged for a product placement to occur at the 5:25 point of the video; specifically, Coca Cola arranged for a new Coca Cola product to be used by a TV show character at the 5:25 point. The advertiser further desires to enable user 110 to easily access a website with additional product information.

As IWA 130 is displaying the streamed video, IWA 130 receives the trigger, e.g., as meta-data sent with the streamed video, from the database associated with IWE 120, etc. At the 5:25 point, IWA 130, based on the data of or associated with the trigger, selects a display element and overlays the display element over the streaming video. User 110 notices the display element, which appears in the lower part of the screen of internet enabled device 115 and displays "Touch here for information on Coca Cola's new product." As the display element catches the attention of user 110, he notices the new Coca Cola product in the TV show. Having some interest in the product, user 110 touches the display element as it is being displayed on the touch-sensitive display of internet enabled device 115, which pauses the video and displays website data associated with a uniform resource locator (URL) on internet enabled device 115.

The URL can be associated with the trigger. For example, when the trigger is added as meta-data to the video content, the URL can also be added to the video content as meta-data, or when the trigger is added to the database associated with IWE 120, the URL can also be added to the database, etc. User 115 navigates around the website exploring the new product. Once he is done exploring the website, he exits the website and associated display element, and the video restarts from the same point.

In some embodiments, the URL is provided by third party platform 125. When the video content provider inserts the trigger, rather than associating data that identifies the URL of the website to display with the trigger, contact information for third party platform 125, such as a URL or an Internet Protocol (IP) address associated with third party platform 125, can be associated with the trigger. When IWA 130 receives the trigger data, IWA 130 communicates with third party platform 125 based on the contact information, and obtains the URL for the website to display from third party platform 125.

When the video reaches the 5:25 trigger point, IWA 130, based on the data of or associated with the trigger, selects a display element and overlays the display element over the streaming video. User 110 notices the display element, which appears in the lower part of the screen of internet enabled device 115 and displays "Touch here for information on Coca Cola's new product." When user 110 touches the display element as it is displayed on internet enabled device 115, the video is paused and the website data associated with the URL obtained from third party platform 125 is displayed on internet enabled device 115. Once user 115 is done exploring the website, he exits the website and associated display element, and the video restarts from the same point.

The IWA can be installed on various devices, and even multiple devices. For example, an instance of the IWA can be installed at a device of media center 105, such as the streaming device, and/or can be installed at mobile device 135. In some embodiments, IWE 120 and/or IWA 130, as well as other components, can interact with mobile device 135. For example, the user's actions on a device of media center 105 can instigate an action on mobile device 135, or the user's actions on mobile device 135 can instigate an action on a device of media center 105. For example, the user can use internet enabled device 115 to initiate display of a video on the TV of media center 105. The initiation of the display of the video can prompt information regarding the video to be displayed on mobile device 135. As a second example, the user can use internet enabled device 115 to initiate display of a video on mobile device 135. The initiation of the display of the video can prompt information regarding the video to be displayed on internet enabled device 115, or on the TV of media center 105 via the streaming device.

Figure 2:
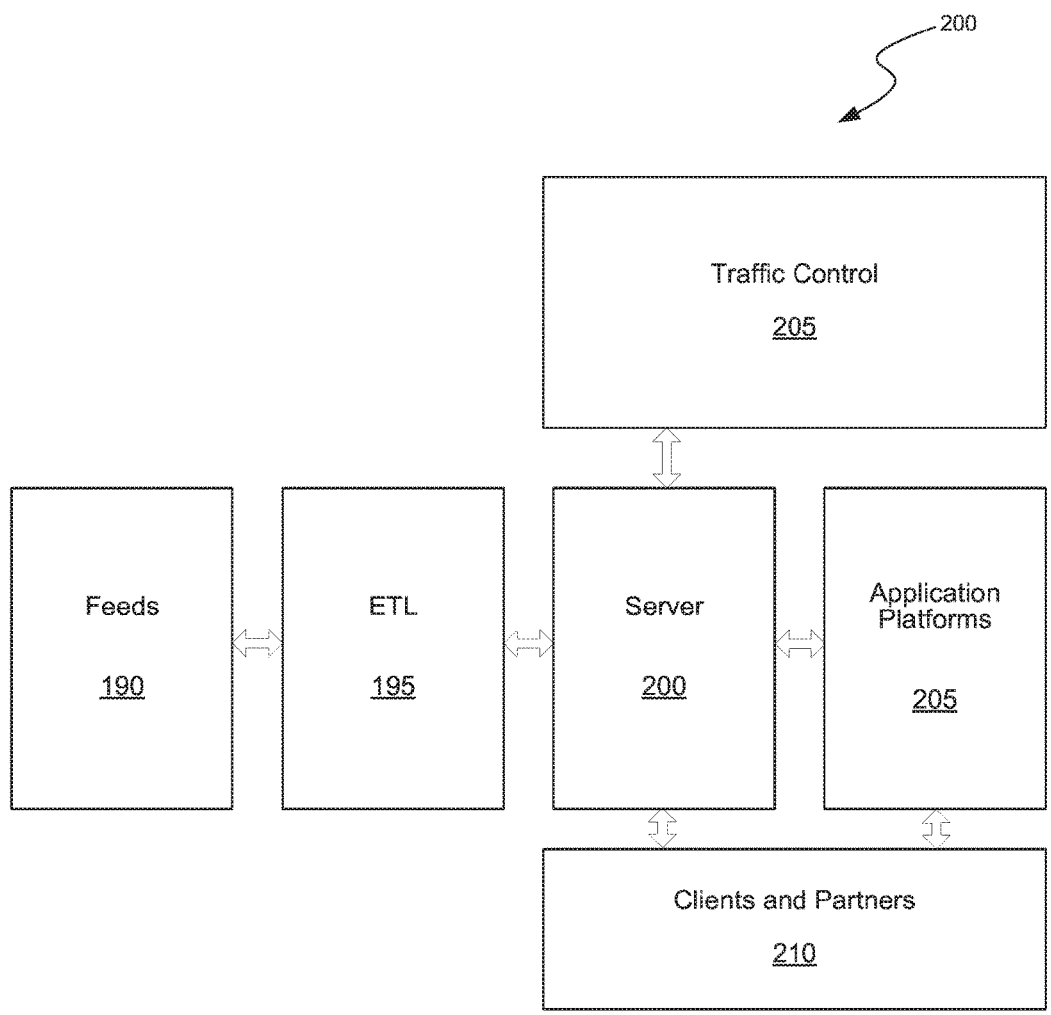
FIG. 2 is a component diagram illustrating an interactive watching environment that enables interactive video viewing, consistent with various embodiments.

FIG. 2 is a component diagram illustrating a platform that enables interactive video viewing, consistent with various embodiments. Interactive watching environment (IWE) 200 includes traffic control 205, feeds 210, extract, transform, and load (ETL) 215, server environment 220, application platforms 225, and clients and partners 230. Each of these components will be discussed is further detail in the following figures, and will be discussed only briefly here. The communication flow indicated in the embodiment of this figure is not a representation of the communication between the components for all embodiments. For example, in some embodiments, feeds 210 can bi-directionally communicate with server environment 220, and can bi-directionally communicate with an internet enabled device of application platforms 225. As a second example, in other embodiments, feeds 210 has a one-way communication with ETL 215. In various embodiments IWE 200 can be the same as IWE 120 of FIG. 1, can include IWE 120 and third party platform 125, or can be different.

In the embodiment of FIG. 2, traffic control 205 is a component or platform for scheduling and managing video content that gets delivered to an IWA that runs on an internet enabled device of application platforms 225. For example, a video content provider uses traffic control 205 to create triggers for additional content to appear on a user's internet enabled device. Feeds 210 is a source of multiple data feeds, such as video on demand, a streaming of a real time feed of NBC (e.g., a stream that is similar to the video that is being broadcast by NBC over the public airwaves), a feed of meta-data associated with a video feed, etc. ETL 215 is a module that blends all the feeds from feeds 210 together so they relate and so that IWA 130 can deliver an interactive user experience.

For example, one feed can be a real time stream of NBC, a second feed can be program schedule data for NBC, and a third feed can be content information regarding NBC programs. ETL 215 can relate the real time NBC stream with the program schedule data, can relate the real time NBC stream with the content information, and can relate the program schedule data with the content information. These cross-relations or "blending" between the data of the various feeds can be stored in a database of server environment 220. Server environment 220 can include one or more processing devices of FIG. 31, such as processing device 3100. Applications platforms 225 are the various internet enabled devices, such as internet enabled device 115, that can run an IWA application. These various internet enabled devices are the devices which a user, such as user 110, can use to experience interactive video viewing. Clients and partners 230 are platforms of various business entities that have a special business relationship with the entity that provides IWE 200. These business entities may have enhanced access to various components of IWE 200, such as via an application programming interface (API) to one or more components of IWE 200, or may provide special content or data to IWE 200, such as video or data for or to enhance targeted advertising.

Figure 3:
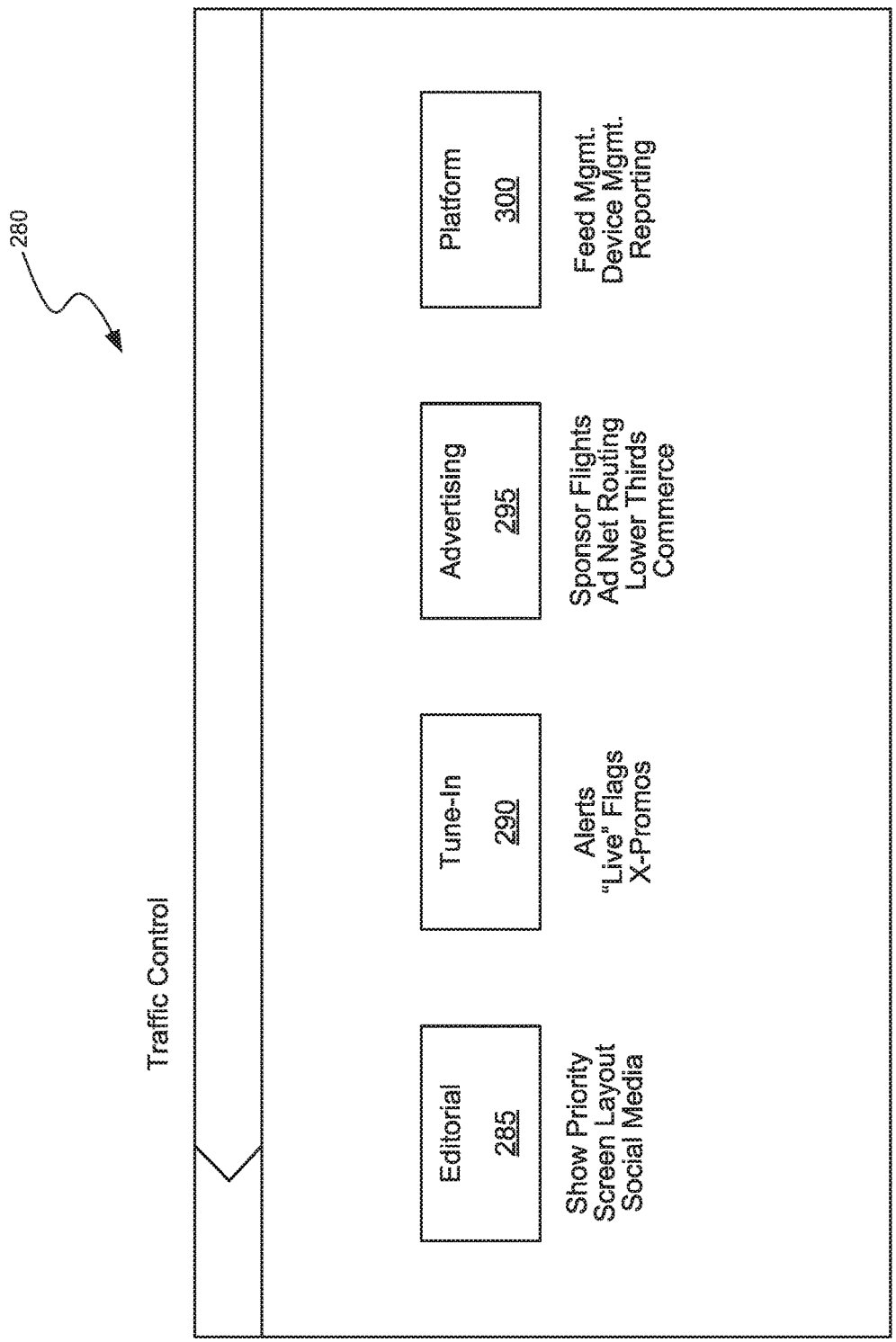
FIG. 3 is a diagram illustrating a traffic control component of the interactive watching environment, consistent with various embodiments.

FIG. 3 is a diagram illustrating a traffic control component of the interactive watching environment, consistent with various embodiments. Traffic control 300, which can be the same as traffic control 205, is a component or platform for scheduling and managing video content that gets delivered to an IWA that runs on an internet enabled device of application platforms 225. For example, a video content provider uses traffic control 300 to create triggers for additional content to appear as an overlay over video being streamed to a user's internet enabled device. In the embodiment of FIG. 3, traffic control 300 includes editorial 305, tune-in 310, advertising 315, and platform 320.

In some embodiments, traffic control 300 is an application running on a server. An employee of a content provider loads a video onto the server and opens the video utilizing traffic control 300. The employee identifies various events in or meta-data associated with the video and uses traffic control 300 to enter a trigger. The capabilities of traffic control 300 are organized into several groups. Editorial 305 contains functions that enable the employee to insert triggers related to show priority, screen layout, and social media. Tune-in 310 contains functions that enable the employee to insert triggers related to alerts, "Live" flags, and cross-promotions (x-promos). Advertising 315 contains functions that enable the employee to insert triggers related to sponsor flights, ad net routing, lower thirds, or commerce. Platform 320 contains functions that enable the employee to insert triggers related to feed management, device management, and reporting.

The functions of editorial 305 can be used to insert a trigger that, for example, triggers the display of an element as an overlay over a portion of a streaming video that is being displayed by an internet enabled device, such as internet enabled device 115. For example, the employee creates a trigger that triggers at a defined point in the program, such as at the 25:30 point, which in this example is when the program credits are displayed. When a user watches the program on his internet enabled device, the trigger at the 25:30 point of the program triggers a social media element to be displayed as an overlay over the program as it is streamed to the user's internet enabled device and displayed. The social media element displays a message stating "Share this program on Facebook™." If the user touches the screen where indicated, IWE 200 causes a message to be posted on Facebook under the user's account to notify the user's Facebook friends that the user is watching that program.

The trigger can be stored in or added to various places related to the video. For example, the trigger can be added to the video content as meta-data. As another example, the employee uses traffic control 205 the trigger can be added to a database associated with IWE 200, such as in a database of server environment 220, and the trigger can be associated with a particular video, such as by being linked to the video in the database.

The functions of tune-in 310 can similarly be used to insert a trigger. In addition to being able to support video on demand, IWE 200 can support live video. For example, a major network will be, at 2:00 pm tomorrow and through the feed for their network, streaming a baseball game live (i.e., in real time as the game is being played). The employee creates a trigger that triggers the display of a "live" flag element at 2:00 pm the following day.

In this situation the employee cannot add the trigger to the video content, as the video does not exist and will not exist prior to being streamed live. Here, the trigger is added to a database associated with IWE 200. If a user is watching the real time stream of the network using an internet enabled device, the internet enabled device, by communicating with IWE 200, will receive the trigger which is read from the database and sent to the internet enabled device by a component of IWE 200. Upon receiving the trigger from IWE 200 and the clock arriving at 2:00 pm, the internet enabled device displays an overlay of the "live" flag element to notify the user that the game is being streamed live.

In another example, the employee uses the functions of tune-in 320 to create a cross-promotional trigger. The employee creates a trigger to notify the user about a program that is related to the current program. For example, a news show may be covering the topic of homelessness, and the employee desires to cross-promote a news show on poverty with the show on homelessness, or a political series that has a recurring theme of homelessness. The employee creates a trigger that will trigger the display of a cross-promotional element at a pre-defined point in the program, and that will notify the user, as he is watching the program on homelessness, about an upcoming program on or series related to poverty. The user can touch the display where indicated by the cross-promotional element, which will cause the IWA to take an action.

For example, the IWA can cause a message to be sent to the user's DVR that causes the DVR to schedule to record the program on poverty or each episode of the political series, or the IWA can add the show on poverty or the political series or each episode of the political series to the user's watchlist (i.e., a list of programs that the user desires to watch), or the IWA can load and display website data associated with a URL that is associated with the trigger, or the IWA can cause a trigger that triggers a reminder message to be displayed at the time that the program on poverty or an episode of the political series is scheduled to be streamed, among others.

The functions of advertising 315 can be used similarly to insert a trigger. For example, the employee creates a trigger for a sponsor flight or an ad net routing that triggers at a defined point in the program, or at a time when the sponsor is contextually relevant, such as when an arranged product placement for the sponsor occurs, or when a certain song is playing in the program. When a user watches the program on his internet enabled device, the trigger at the trigger point prompts a sponsor flight or ad net routing element to be displayed as an overlay over the program as it is streamed to the user's internet enabled device and displayed. The sponsor flight element displays a message stating, for example, "Sponsored by BMW™." The ad net routing element displays a commercial of the sponsor to be displayed.

If the user touches the screen, IWE 200 can cause information related to the sponsor to be displayed, such as a website containing information regarding the sponsor's products, other commercials regarding a product of the sponsor, etc. Touching the screen can also initiate a purchase. For example, when the certain song is playing, an overlay display can appear stating "Touch here to purchase this song," and when the user touches the screen, a purchase of the song from an online purchase location is initiated, or even completed via a single-touch purchase mechanism.

The overlay display can also display contextually relevant, personalized information. For example, the interactive watching environment can be aware of and communicate with connected devices of the user, such as a car. When the user has a connected BMW, and the user has provided information that enables the interactive watching environment to communicate with the user's BMW, the interactive watching environment can obtain information regarding the BMW. This can enable the display of contextually relevant, personalized information.

For example, when a BMW commercial displays during playback of a video, the interactive watching environment can communicate with the user's BMW, determine that the BMW needs some maintenance, and can display an overlay display containing the information regarding the needed maintenance (e.g., the overlay display can display "Your BMW is 200 miles over the recommended oil change interval. Would you like to schedule an appointment?" When the user touches the overlay display, a module to schedule an oil change is brought up, enabling the user to schedule a service appointment.

The functions of platform 320 can similarly be used to insert a trigger. For example, the employee creates a trigger that, upon being triggered, checks various feeds for programming or information that may be of interest to the user. Based on the user's profile, which indicates preferences of the user, the trigger can checks the various feeds for programming or information that is related to the indicated preferences of the user.

Figure 4:
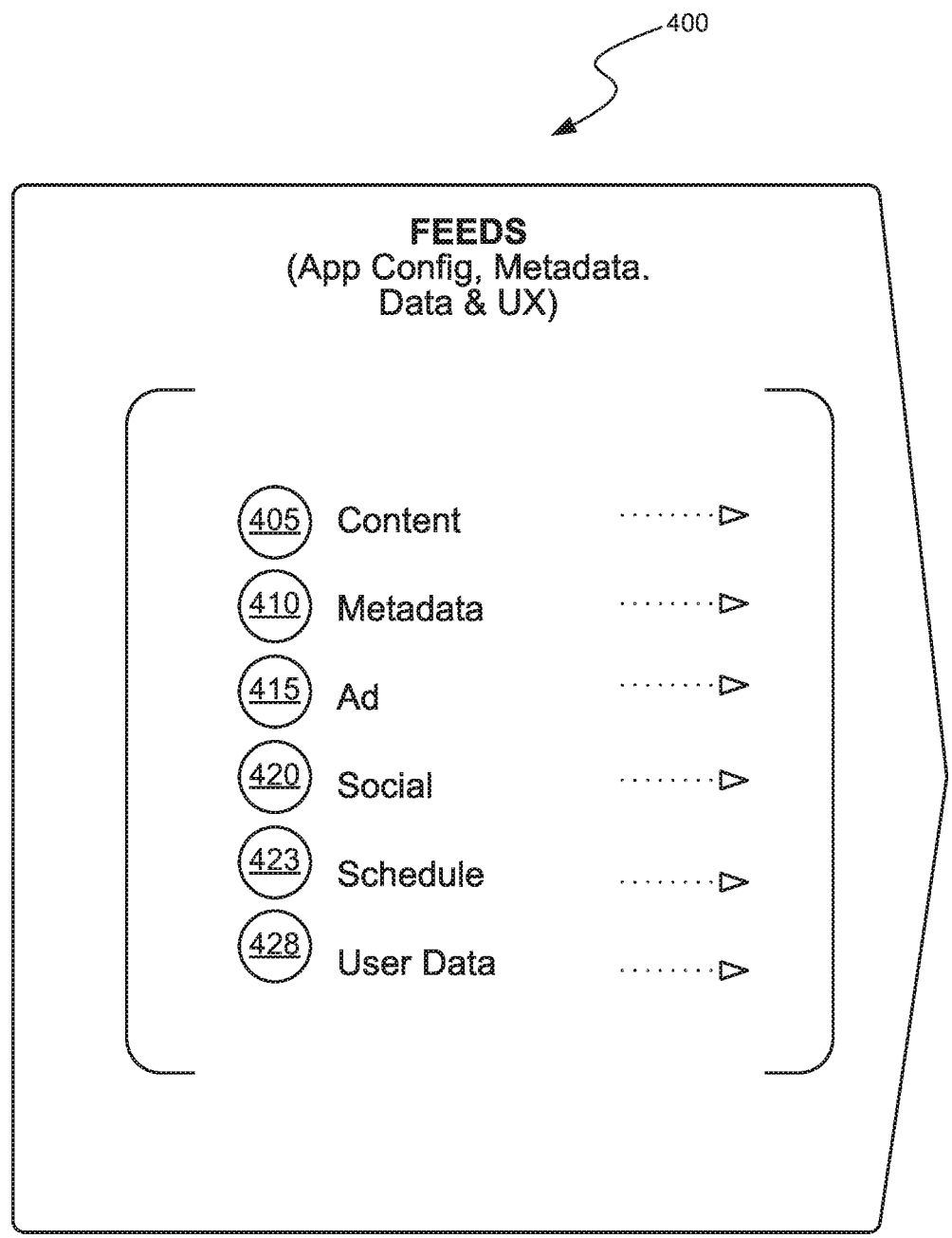
FIG. 4 is a diagram illustrating feeds of video and other data available to the interactive watching environment, consistent with various embodiments.

FIG. 4 is a diagram illustrating feeds of video and other data available to the interactive watching environment, consistent with various embodiments. Feeds 400, which can be the same as feeds 210, includes content 405, meta-data 410, ad 415, social 420, schedule 425, and user data 430. In the embodiment of FIG. 4, a feed is a source of data that can be accessed by an internet enabled device. The feed can be accessed, for example, via a URL, an IP address, etc. Further, the feed can be accessed by any internet enabled device that has permission to access the feed, such as the internet connected devices of application platforms 225, a computer of server environment 220, an internet enabled device of media center 105, etc.

Content 405 is a feed that provides video content. For example, the real time stream of a major network is a video content feed. As another example, a server that provides video on demand is another video content feed. Meta-data 410 is a feed that provides meta-data associated with the video content of content 405. For example, meta-data 410 can be the title of a program, the description of the program, characters of the show, etc. Ad 415 is a feed that provides ads that can be displayed to the user via one of the elements that is accessed by a trigger. For example, ad 415 can be a commercial regarding a product, service, vacation destination, charity, political candidate, etc., can be information regarding a product, service, etc. Social 420 is a feed that provides various types of information related to various social media and/or networks. For example, social 420 can provide posts, messages, friend information, profile information, configuration information, etc. associated with various social media and/or networks. This information may be protected, and may require certain permissions to be able to access.

Schedule 425 is a feed that provides schedule data related to programming of a real time stream, such as the real time stream of a major network. For example, the schedule for NBC may identify a certain program as starting at 4:00 pm on a given date, another program as starting at 4:30 pm on that date, etc. User data 430 is a feed that can provide data regarding a user, such as the user's profile data, the user's payment card information (a credit card, a debit or automated teller machine card, a gift card, etc.), the user's address, the user's video viewing history and indicated preferences, the user's purchasing history, etc. This information may also be protected, and may require certain permissions to be able to access.

Figure 5:
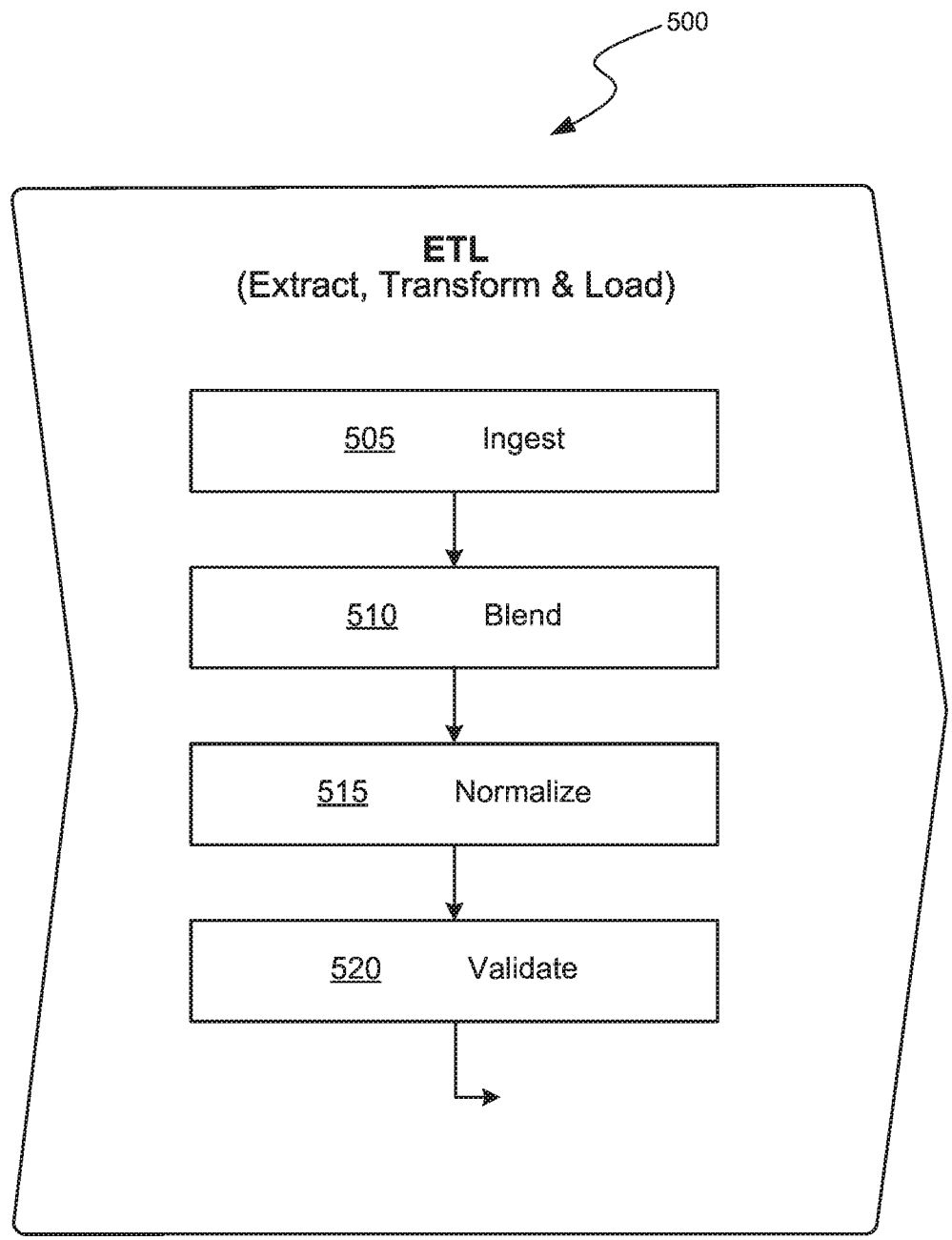
FIG. 5 is a diagram illustrating an extract, transform, and load (ETL) module associated with the interactive watching environment, consistent with various embodiments.

FIG. 5 is a diagram illustrating an extract, transform, and load (ETL) module associated with the interactive watching environment, consistent with various embodiments. ETL 500, which can be the same as ETL 215, includes modules ingest 505, blend 510, normalize 515, and validate 520. In the embodiment of FIG. 5, ETL 500 obtains data from the various feeds of feeds 400 of FIG. 4, and relates all the information in order to create a compelling and interactive video watching experience for the user. While ingest 505 executes, data from the various feeds is received by ETL 500 and information relevant is extracted from the feed data in preparation for blending and normalization. For example, after receiving data from the various feeds and in preparation for blending and normalizing the data to create a compelling video watching experience of a particular video for the user, ingest 405 obtains and/or extracts data from the various feeds to locate the data relevant to the desired video watching experience.

Ingest 505 obtains a video from content 405, determines the title of the video based on data from metadata 410, obtains information from ad 415 regarding an ad that is to be displayed based on a trigger associated with the video, and obtains user data regarding the user's video viewing preferences from user data 430. The trigger can have been associated with the video by the video content provider utilizing traffic control 300. Ingest 505 can accomplish this in various ways, such as by parsing the data from the feed to determine the feed data that is related to the video, by sending a message to a feed requesting data that is related to the video, etc. For example, for a feed that continuously broadcasts data, ingest 505 can continuously parse the broadcast data, determine the data of interest, such as determining all the data from the various feeds that are related to all the programs that are on the user's watchlist, and can store that data, such as in a database. As another example, for a feed that responds to requests, as a video is being processed by ingest 505, ingest 505 can send a message to the feed requesting data related to the video, such as the title, storyline, characters, etc. of the video.

Blend 510 blends relevant data from the various feeds together to create a compelling video watching experience for the user. For example, the video is associated, such as via a link in a database, with the program title, storyline, and characters of the video by ingest 505. The video is further associated by ingest 510 with an ad from ad 415 that is to be displayed by the trigger associated with the video. Based on the user data from user data 430 regarding the user's video viewing preferences, schedule data from meta-data 410 is searched for programs that may be of interest to the user and the video is further associated with those programs of interest. For example, based on user data where the user indicates a preference for reality TV programs, blend 510 finds an available or upcoming episode of a reality TV program and associates the program with the video. As a second example, based on user data that indicates a history of the user watching a particular reality TV program, blend 510 finds an available or upcoming episode of the particular reality TV program and associates the program with the video.

Blend 510 can also associate triggers with the video. While some of the data that blend 510 identified can be associated with triggers associated with the video via traffic control 300, blend 510 can itself associate triggers with the video in order to create the desired video watching experience. Blend 510, based on schedule data from schedule 425, can create a trigger that triggers at any time point identified by the schedule data. In various embodiments, time points identified by the schedule data from schedule 425 include when the program starts and ends, when commercial breaks start and end, when a particular program character enters or leaves a scene of the program, when a product placement in the program begins or ends, etc.

Blend 510, based on scanning the video to identify certain events, can create a trigger that triggers at any of these events. In various embodiments, events that are identified by blend 510 can include identifying when the program starts and ends, identifying when commercial breaks start and end, identifying when a particular program character enters or leaves a scene of the program, identifying when a particular product appears in a scene, etc.

To create a compelling video watching experience for the user, blend 510 can associate plan to display a sequence of information that is intended to enhance the user's video viewing experience. For example, blend 510 can associate a first trigger with the video that triggers at the beginning of the TV program or movie of the video, and that causes the an IWA on the user's internet enabled device that he uses to watch the video to display a element that overlays part of the video and that displays "Touch here for information regarding this program." Ingest 505 obtained a URL of a website containing information regarding the program from meta-data 410, and blend 510 associated this website with the first trigger.

Blend 510 can associate a second trigger with the video that triggers at when a product placement occurs, and that causes the an IWA on the user's internet enabled device that he uses to watch the video to display a element that overlays part of the video and that displays "Touch here for information regarding product ABC," where ABC is the name of the product. Blend 510 can associate an ad from ad 415 with a third trigger that was previously associated with the video using traffic control 300. Blend 510 associates an ad for product ABC, the product that has a product placement in the video, with the third trigger.

Normalize 515 is where video content from the various feeds are inter-related and associated with the video. For example, normalize 515 prepares a video containing a program for viewing by the user where the program is from a news feed that streams news-related video content 24 hours a day 7 days a week. In preparing the video for viewing, normalize 515 scans the content of videos available from the various feeds to find shows that are related, and that the user may find interesting. In preparing a video of a cooking show with a celebrity chef for viewing, normalize 515 scans other feeds and finds two other cooking shows featuring this celebrity chef and associates these shows with the video. Normalize 515 further creates a trigger that triggers when the celebrity chef first enters a scene of the program, and that causes an informational element to be displayed upon being triggered. The informational element displays information regarding these two other cooking shows, and offers to place these shows in the user's watchlist, or to schedule the two other cooking shows for recording by the user's DVR.

Validate 520 is where the associations and/or triggers created by ingest 505, blend 510, and normalize 515 are validated. The validation can check for various potential issues, such as ensuring that the triggers that were created have correct syntax, that the web data addressed by the URL are available, that the feed data linked to by the trigger are available, etc.

Figure 6:
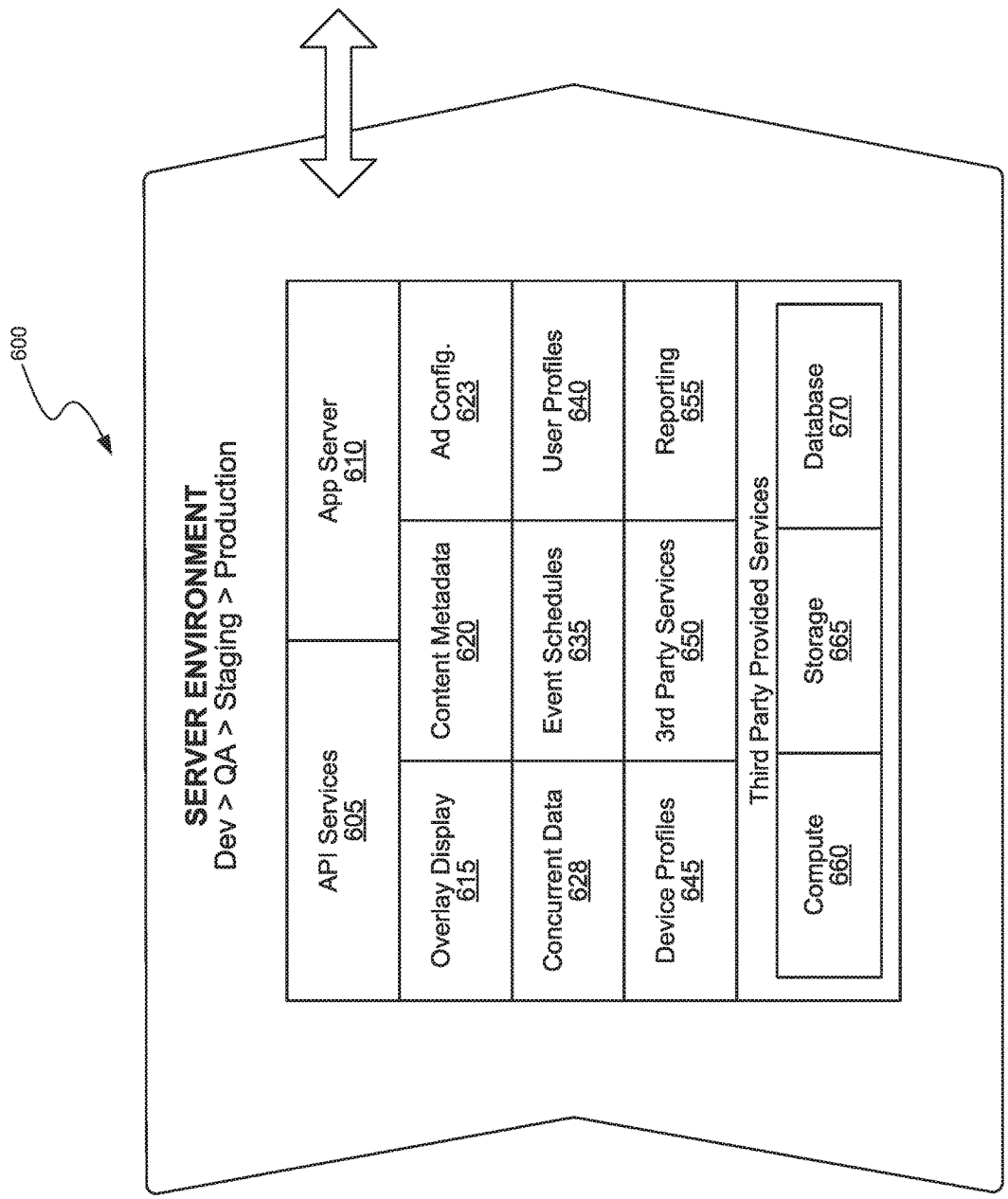
FIG. 6 is a diagram illustrating a server environment associated with the interactive watching environment, consistent with various embodiments.

FIG. 6 is a diagram illustrating a server environment associated with the interactive watching environment, consistent with various embodiments. Server environment 600, which can be the same as server environment 220, is where the video content data, some or all of the triggers, some or all of the various associations created by the various modules of ETL 500, etc. is staged for production. Server environment 600 can include one or more processing devices of FIG. 31, such as processing device 3100. During production, the data stored at server environment 600 is streamed or sent to the user's internet enabled device for viewing. In the embodiment of FIG. 6, server environment 600 includes API services 605, app server 610, lower thirds 615, content meta-data 620, ad config. 625, concurrent data 630, event schedules 635, user profiles 640, device profiles 645, third party services 650, reporting 655, compute 660, storage 665, and database 670. Compute 660 and storage 665 are hardware components of the embodiment of server environment 600 of FIG. 6, while labels 605-655 and 670 represent applications that run on the hardware components of server environment 600. Compute 660, storage 665, and database 670 can be provided as services from a third party.

In the embodiment of FIG. 6, APR services 605 is an API that can be utilized by applications, such as applications developed by third parties, to access, process, manipulate, etc. the data stored at server environment 600. App server 610 is an application server, which is software that supports execution of procedures (programs, routines, scripts, etc.) for applications that run on the hardware components of server environment 600. Overlay display 615 is a module associated with providing elements and other data needed by the IWA running on the user's internet enabled device to display the overlays. For example, overlay display 615 has access to a library of elements for various purposes, such as a social media element for a social media related overlay, a "live" flag element for an overlay to indicate a "live" event, etc., and these elements can be sent to the IWA running on the user's internet enabled device as they are requested, such as during processing of the triggers.

Content meta-data 620 is a module that keeps track of the meta-data from meta-data 410, and that sends this meta-data to the IWA running on the user's internet enabled device as they are requested, such as during processing of the triggers. Ad config. 625 has access to ads from ad 415, as well as from other places such as clients and partners 800 of FIG. 8. ad config. 625 can send these ads to the IWA running on the user's internet enabled device as they are requested during processing of the triggers, such as during processing of the triggers. Concurrent data 630 stores and organizes data in a way optimized for access by multiple computing threads/processes on a computer. Event schedules 635 has access to and/or manages some or all of the triggers that are created by traffic control 300 or ETL 400.

User profiles 640 has access to and/or manages user profiles of the user(s) of server environment 600. User profiles 640 can access user data from user data 430, as well as user data from user data 430 after being processed by ETL 500, such as by accessing storage 665 via database 670 to obtain the user data. The user profile data of user profiles 640 can include user data such as the name, address, phone number, etc. of the user, payment card information of payment cards of the user (to support online purchases made via the IWA running on the user's internet enabled device), etc. Device profiles 645 has access to and/or manages information regarding various devices associated with the user, such as the devices of media center 105 or of application platforms 700 of FIG. 7. Utilizing the data of device profiles 645, a user could, for example, touch an overlay display that informs the user of a program that may be of interest, and cause the program to be scheduled for recording on the user's DVR. The information needed to communicate with the user's DVR is obtained from device profiles 645.

Third party services 650 has access to and/or manages data provided or associated with third party services, such as third party platform 125 or clients and partners 800. In other embodiments, server environment 600 can be organized differently and can include application software and modules of different functionality.

Figure 7:
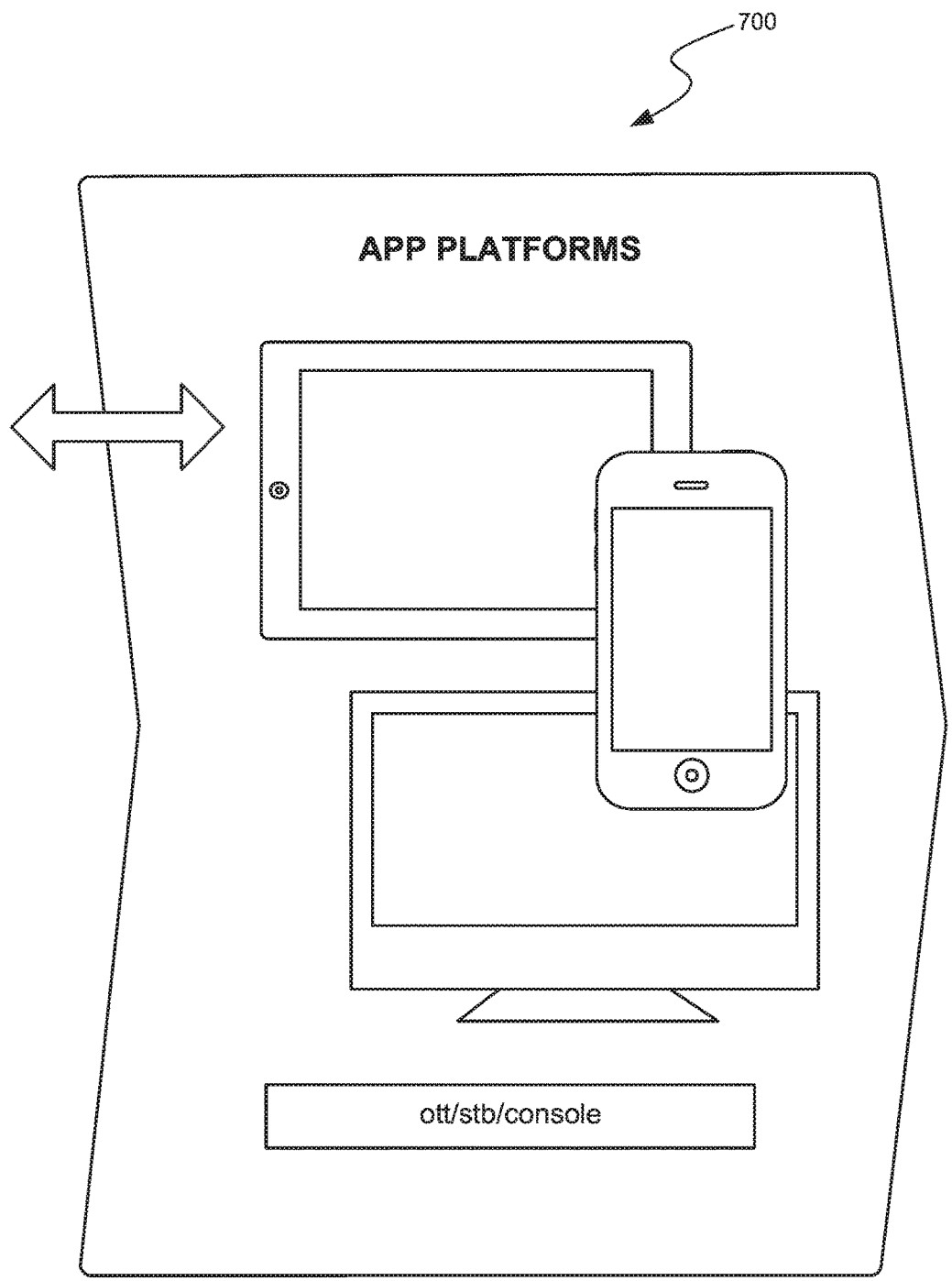
FIG. 7 is a diagram illustrating application platforms that can interact with the interactive watching environment, consistent with various embodiments.

FIG. 7 is a diagram illustrating application platforms that can interact with the interactive watching environment, consistent with various embodiments. Application platforms 700, which can be the same as application platforms 225, includes platforms that can interact with the IWE to provide the interactive watching experience, examples of which include internet enabled devices that include a display, such as internet enabled device 115.

In some embodiments, to interact with the IWE, the internet enabled device includes an IWA. In some embodiments, the internet enabled device is purchased with the IWA pre-installed. In other embodiments, the user downloads the IWA and installs the IWA on his internet enabled device. For example, the user visits an online application store and selects the IWA from a list of applications that are available for download. The user then initiates a download of the IWA to his internet enabled device, where he installs the application.

Once the IWA is installed, the user can use the IWA to interact with IWE 200. In one example, the user taps on the IWA icon on his internet enabled device to launch the IWA. The user then uses the IWA to bring up a list of video content available for viewing. The user selects a video from the list of available video content. When the video is stored at server environment 700, IWE 200 can initiate streaming the video to the user's internet enabled device. When the video is available from a feed, IWE 200 can provide an address from which the IWA can obtain the video. For example, IWE 200 can send the URL or IP address of a feed from feeds 400, or of another source of the video, to the IWA, and the IWA can initiate streaming of the video from the feed or the other source.

The IWA can provide various other capabilities, such as: discover and launch video by browsing a feature screen; view a list of shows available in the IWA; view a listing of all episodes of a series that are available; track a user's viewing history to enable advanced capabilities, such as resume watching a video where the user left off; review a schedule of previous and upcoming week's TV shows and allow a use to set a reminder for upcoming shows; provide detailed feedback about the IWA; manage settings for storing data, such as where to store history data, watchlists, reminders, etc.; review policy and terms information related to the IWA; watch full episodes and clips using a video player that supports functionality such as play/pause, volume control, jump back 10 seconds, scrub forward/backward; sharing the video via social media, email, and/or hardware that enables a user to display the video on a remote screen (e.g., airplay/chromecast); at the start of a video playback, an overlay display enables the user to interact with connected devices in the room, such as dimming the lighting in the room and change the temperature; communicate data.

As the IWA is receiving the streamed video, IWE 200 is sending other data associated with the video, such as the triggers associated with the video that were created by traffic control 300 and/or ETL 500. The IWA receives a first trigger, which is set to trigger at the 5:25 point of the video. Once the 5:25 point of the video is reached, the IWA overlays a display element over a portion of the video to create an overlay display. The display element displays "Touch here for information about this program." When the user touches the display, the IWA pauses the video and loads web data from a URL that is associated with the trigger. The user is able to navigate around the web data and explores the program. When he is done, he exits viewing the web data and the video resumes playing. As the video continues playing, the IWA via the triggers that are associated with the video provides an interactive viewing experience for the user.

Figure 8:
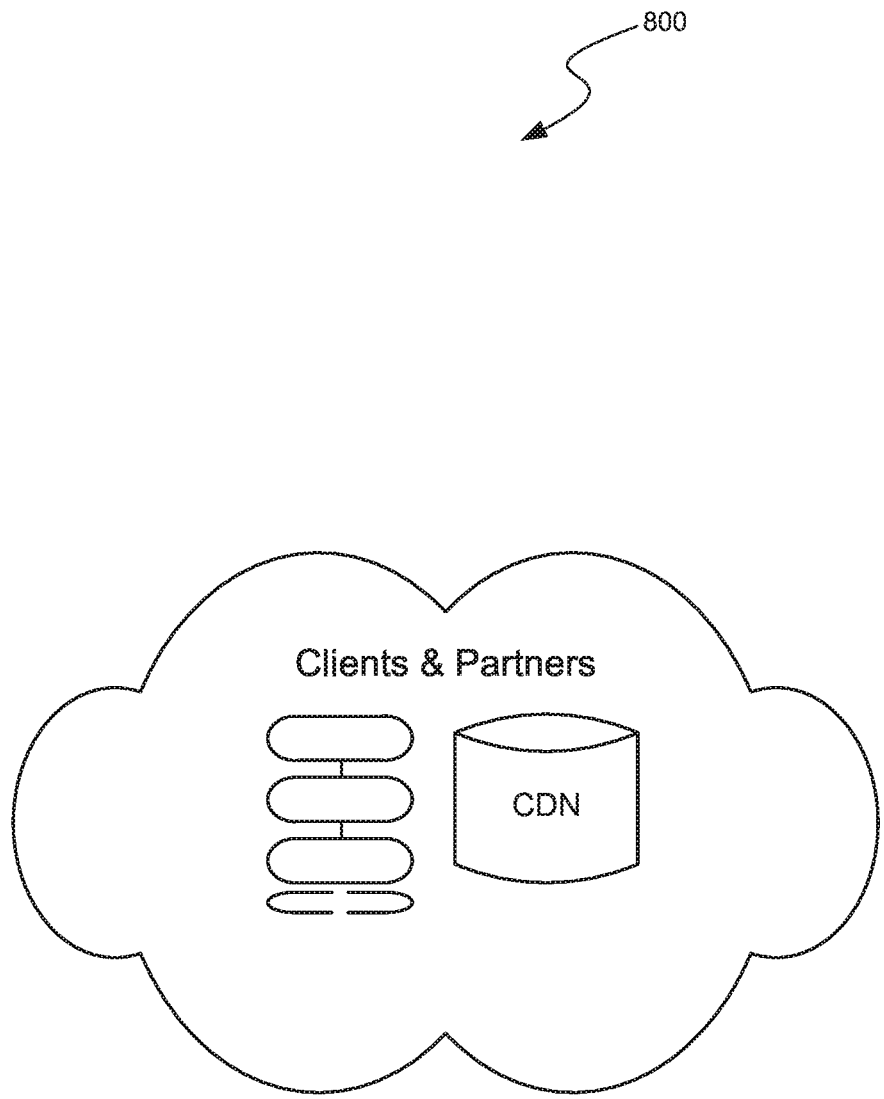
FIG. 8 is a diagram illustrating client and partner environments that can interact with the interactive watching environment, consistent with various embodiments.

FIG. 8 is a diagram illustrating client and partner environments that can interact with the interactive watching environment, consistent with various embodiments. Clients and partners 800, which can be the same as clients and partners 230, represent the platforms of various business entities that have a special business relationship with the entity that provides IWE 200. These business entities may have enhanced access to various components of IWE 200, such as via an API (e.g., API services 605), to one or more components of IWE 200, or may provide special content or data to IWE 200.

Figure 9:
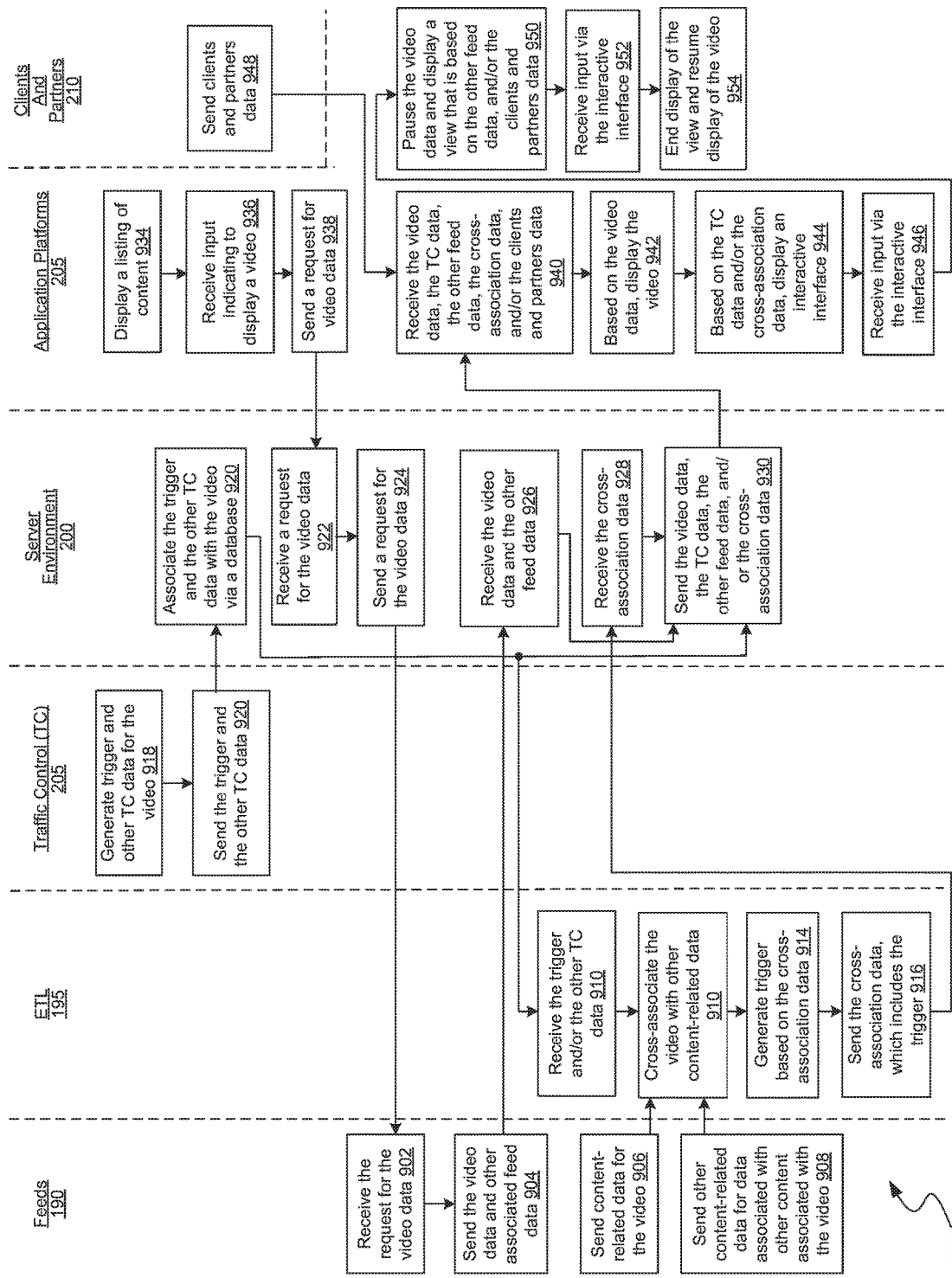
FIG. 9 is an activity diagram illustrating a process for providing an interactive video viewing experience to a user, consistent with various embodiments.

FIG. 9 is an activity diagram illustrating a process for providing an interactive video viewing experience to a user, consistent with various embodiments. In the example of illustration 900, a user, such as user 110, desires to watch an episode of a TV show utilizing the interactive viewing environment, and wishes to view the episode from a video on demand (VOD) provider. The user has an instance of an IWA installed on one of his applications platforms 225, in this example, a tablet computer. The user launches the IWA, and interacts with the touch display of the tablet computer to indicate that he wants a listing of available content to be displayed on the tablet computer (step 934). He navigates through the listing to find the TV show that he desires to watch, and he selects the TV show by touching it. He touches a play button that is displayed to indicate for the tablet computer to play the TV show (step 936). The tablet computer sends a request for the TV show to a server of server environment 220 (step 938). The request can be a message containing a URL or IP address of where the TV show is available.

Prior to being made available to users, a content provider prepared the TV show for an interactive viewing experience. An employee of the content provider loaded the TV show on a computer that had traffic control (TC) 205 installed. The employee used TC 205 to view the TV show, and to generate triggers and other TC data for the TV show (step 918). After the TV show was properly prepared to provide the desired interactive viewing experience, the TV show was released for production to server environment 220, and the triggers and the other TC data were sent to the server of server environment 220. In some embodiments, the TV show is also sent to the server. The server associates the trigger and the other TC data with the TV show using a database (step 922).

The server sends the trigger and/or the other TC data to a server with ETL 215 installed, where the data is received (step 910). ETL 215 obtains content-related data for the TV show from a feed of feeds 210 (step 906). For example, ETL 215 can obtain a description of the show, a listing of the commercials of the show, a listing of product placements of the show, etc. ETL 215 also obtains other content-related data for data associated with other content associated with the TV show (step 908). For example, ETL 215 can obtain the video of the commercial to be displayed during a certain commercial break that is in the listing of commercials, or can obtain product information or URL addresses of product related websites to be made available via an overlay display during a product placement.

ETL 215 cross-associates the TV show with the data received during steps 906-910. The associated videos, URLs, information, quizzes, etc. are woven together and cross-associated to create the desired interactive viewing experience. ETL 215 sends the cross-association data to the server of server environment 22o (step 926), where the cross-association data is received (step 930). The TV show is now made available for viewing by the users.

At step 938, the tablet computer sent the request for the TV show to the server, and at step 924, the server of server environment 924 receives the request, and relays the request to a feed of feeds 210 (step 926), where the TV show is available. The feed in this case is a VOD provider, and the VOD provider receives the request for the TV show (step 902). The VOD provider accesses the TV show from a database, and sends the video data and other associated feed data to the server (step 904), where it is received (step 928). The other associated feed data can be, for example, a description of the episode, a listing of the characters and the actors playing the characters, a listing of product placements in the show and associated times when they appear, a listing of the commercials in the show and associated times when they appear, etc. In some embodiments, this information (i.e., the listing of the characters, etc.) is available from other feeds of feeds 210, and is sent to the server at step 906 and/or 908.

The server sends the TV show, the TC data, the other feed data, and/or the cross-association data to the tablet computer (step 932), where it is received (step 940). Clients and partners 230 can also send clients and partners data to the tablet computer (step 948), where it is also received (step 940). The clients and partners data can be, for example, data received via an API that is provided to the clients and partners, video or data for enhanced targeted advertising, etc.

The tablet computer displays the TV show (step 942), and, based on the TC data, and/or the cross association data, displays an interactive interface (step 944), which can include an overlay display. The TV show can continue playing while the interactive interface is being displayed. For example, based on a trigger, the tablet computer displays an overlap display that enables a user to obtain further information related to the TV show. The TV show continues playing until the user touches the overlay display (step 946), at which point the tablet computer uses the cross-association data to obtain a URL containing information regarding the show, and displays the website data of the URL and pauses the video (step 950). The user navigates around the website data using the tablet computer (step 952), and when done, the user exits the website and the TV show resumes playing (step 954). As the TV show continues playing, additional overlay displays and/or other interactive interfaces are generated and displayed based on the data that was earlier woven together, and that the IWA running on the tablet computer is receiving and responding to.

FIGS. 10-31 illustrate various use cases enabled utilizing the technique of the disclosure. In FIGS. 10-31, a numeric label with an asterisk, such as 1005\* or 615\* of FIG. 10, indicate a component or module that is being utilized in the use case illustrated in that figure.

Figure 10:
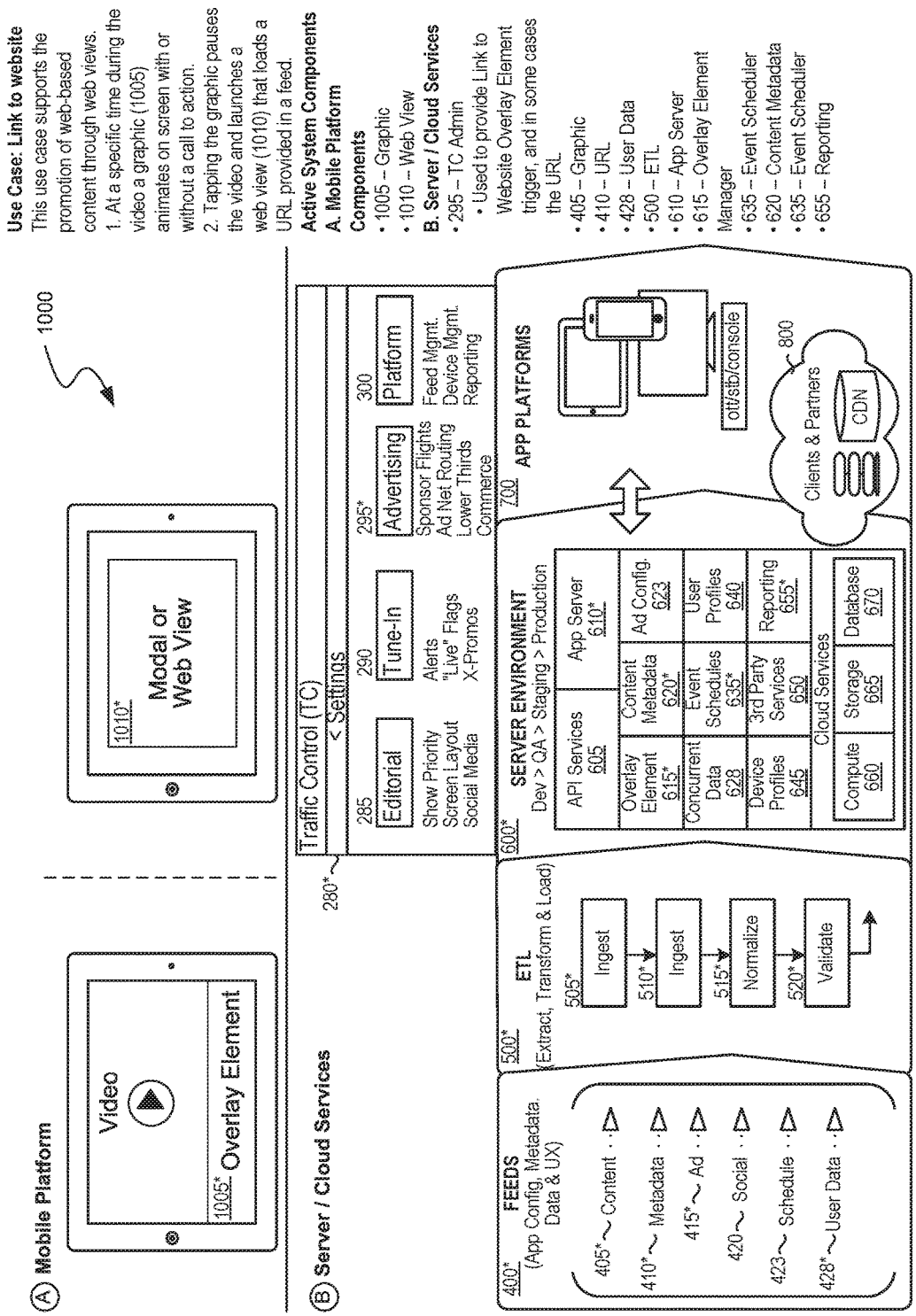
FIG. 10 is a diagram illustrating a "link to website" use case, consistent with various embodiments.

FIG. 10 is a diagram illustrating a "link to website" use case, consistent with various embodiments. The website use case illustrated can be executed utilizing the various components and modules of system 1000. System 1000 includes an internet enabled device displaying an overlay element view 1005, and shows the same internet enabled device displaying a model or web view 1010. A model view, sometimes referred to as a modal window, is a child view that opens over an existing view, such as over a view or window of a parent application. A modal view can require a user to interact with the model view before the user can return to operating the parent application.

Figure 11:
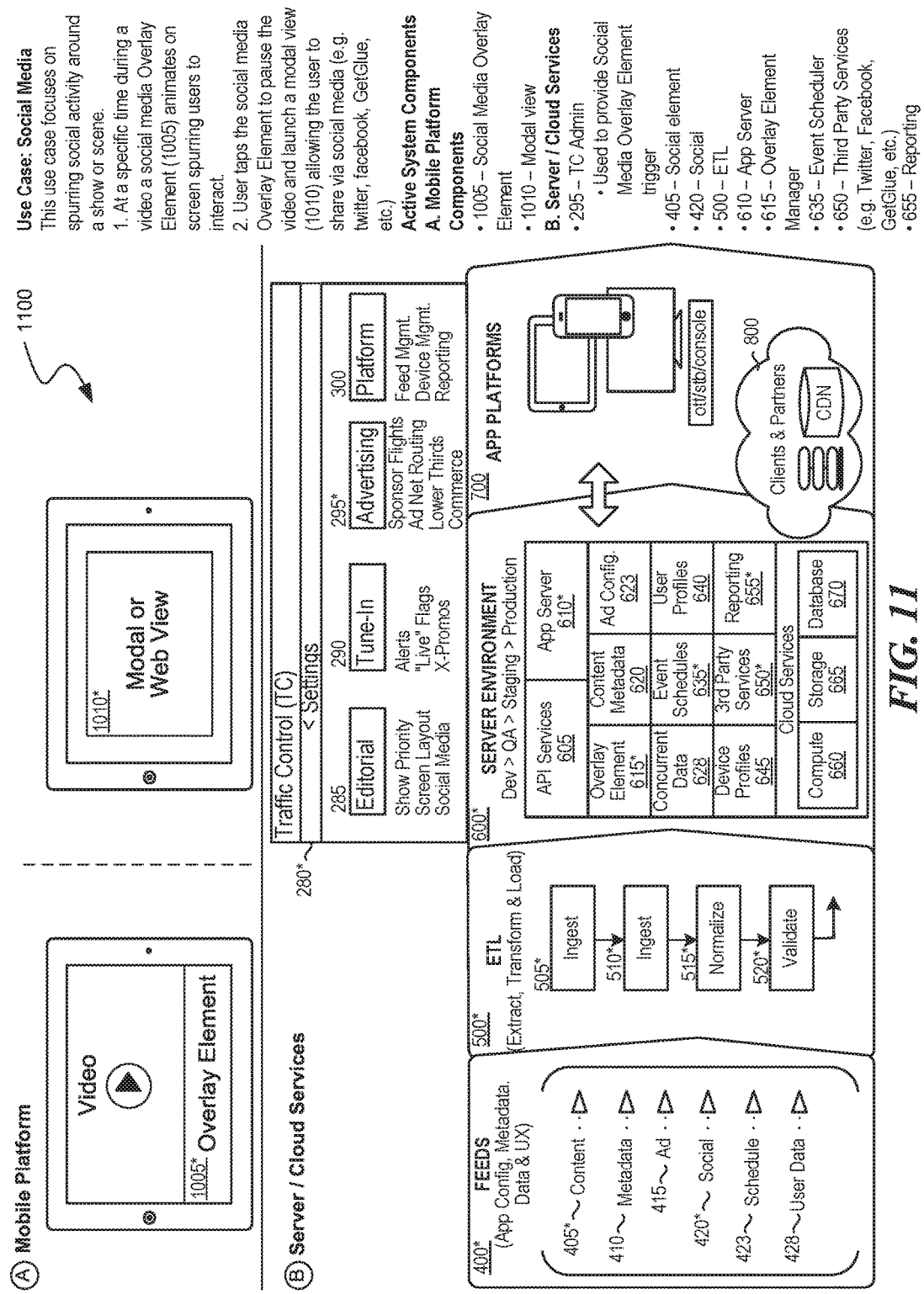
FIG. 11 is a diagram illustrating a social media use case, consistent with various embodiments.

FIG. 11 is a diagram illustrating a social media use case, consistent with various embodiments. The social media use case illustrated can be executed utilizing the various components and modules of system 1100.

Figure 12:
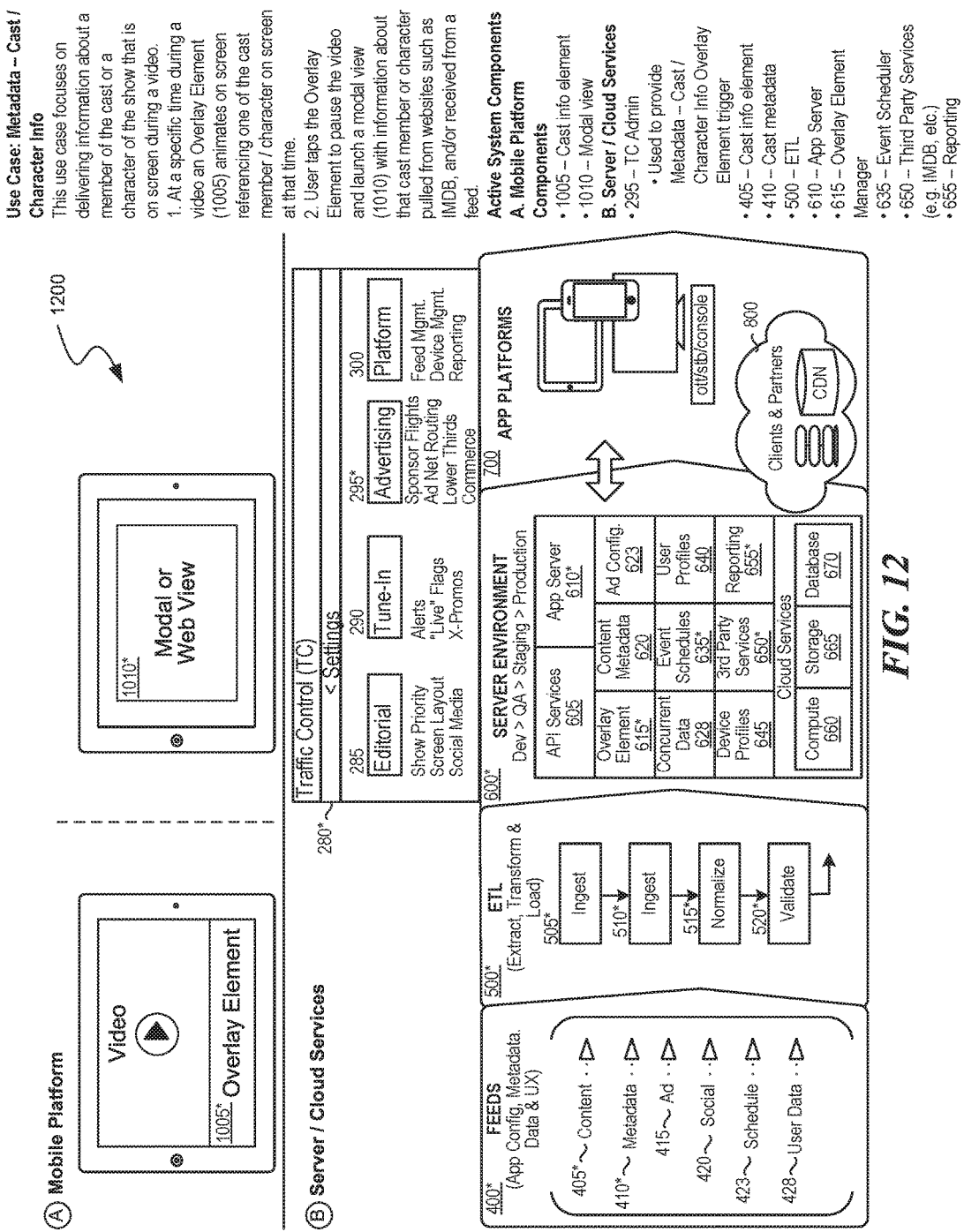
FIG. 12 is a diagram illustrating a cast/character information meta-data use case, consistent with various embodiments.

FIG. 12 is a diagram illustrating a cast/character information meta-data use case, consistent with various embodiments. The cast/character information meta-data use case illustrated can be executed utilizing the various components and modules of system 1200.

Figure 13:
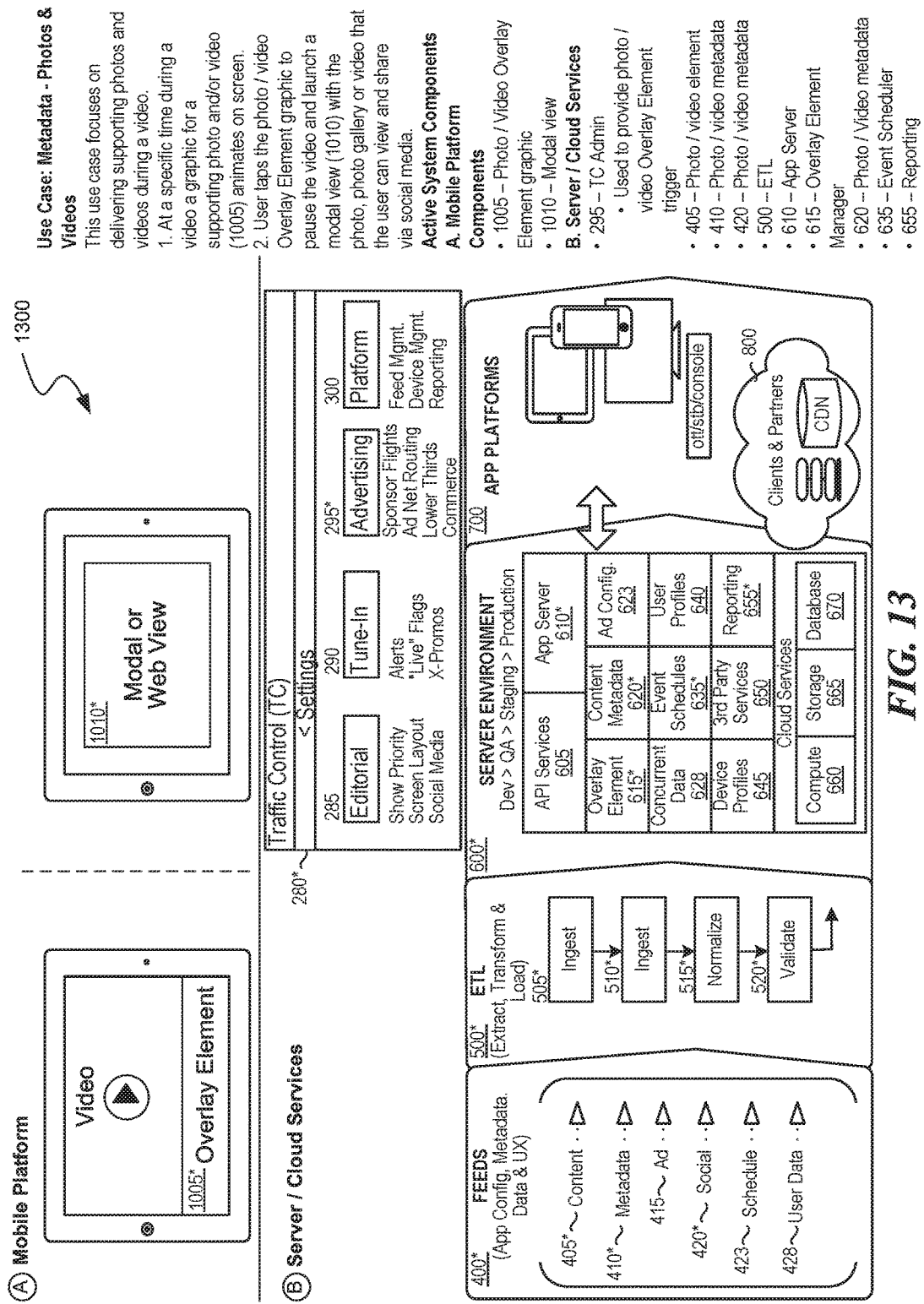
FIG. 13 is a diagram illustrating a photos and videos use case, consistent with various embodiments.

FIG. 13 is a diagram illustrating a photos and videos use case, consistent with various embodiments. The photos and videos use case illustrated can be executed utilizing the various components and modules of system 1300.

Figure 14:
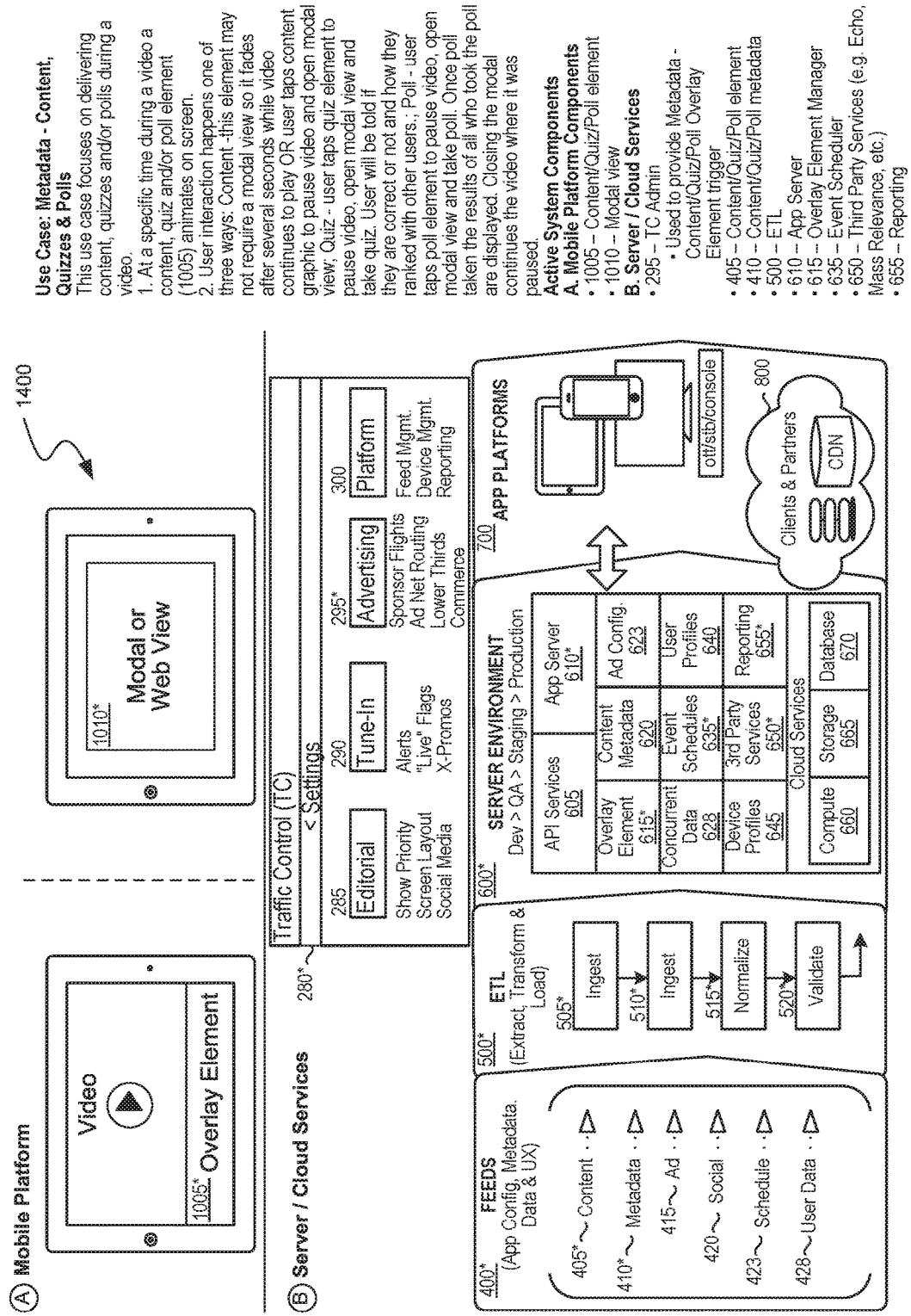
FIG. 14 is a diagram illustrating a content, quizzes, and polls meta-data use case, consistent with various embodiments.

FIG. 14 is a diagram illustrating a content, quizzes, and polls meta-data use case, consistent with various embodiments. The content, quizzes, and polls meta-data use case illustrated can be executed utilizing the various components and modules of system 1400. In addition to the capabilities described on FIG. 14, an overlay display can display sporting event results during video playback.

Figure 15:
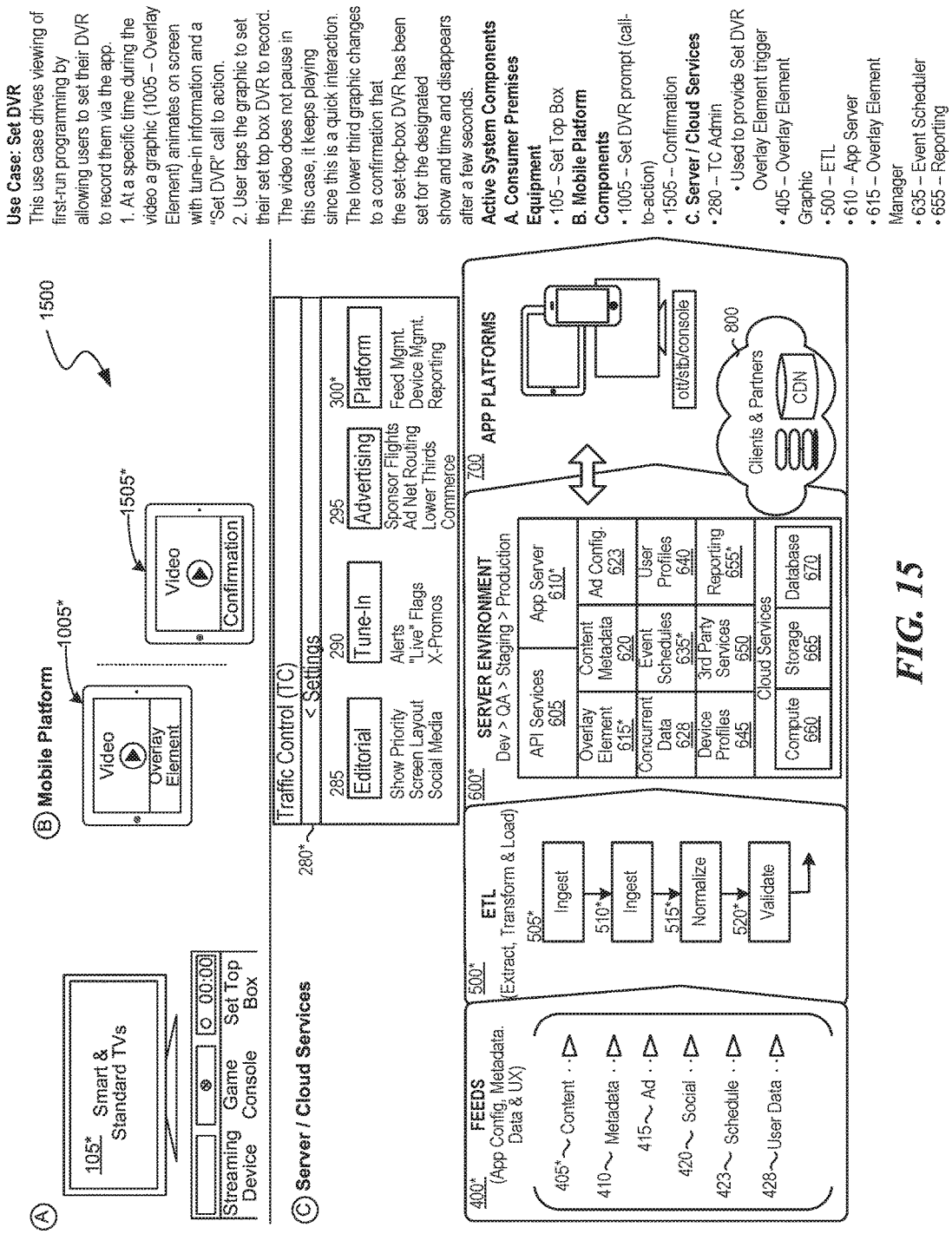
FIG. 15 is a diagram illustrating a set digital video recorder (DVR) use case, consistent with various embodiments.

FIG. 15 is a diagram illustrating a set digital video recorder (DVR) use case, consistent with various embodiments. The set DVR use case illustrated can be executed utilizing the various components and modules of system 1500. System 1500 includes an the same internet enabled device that is displaying overlay element view 1005 also displaying confirmation 1505.

Figure 16:
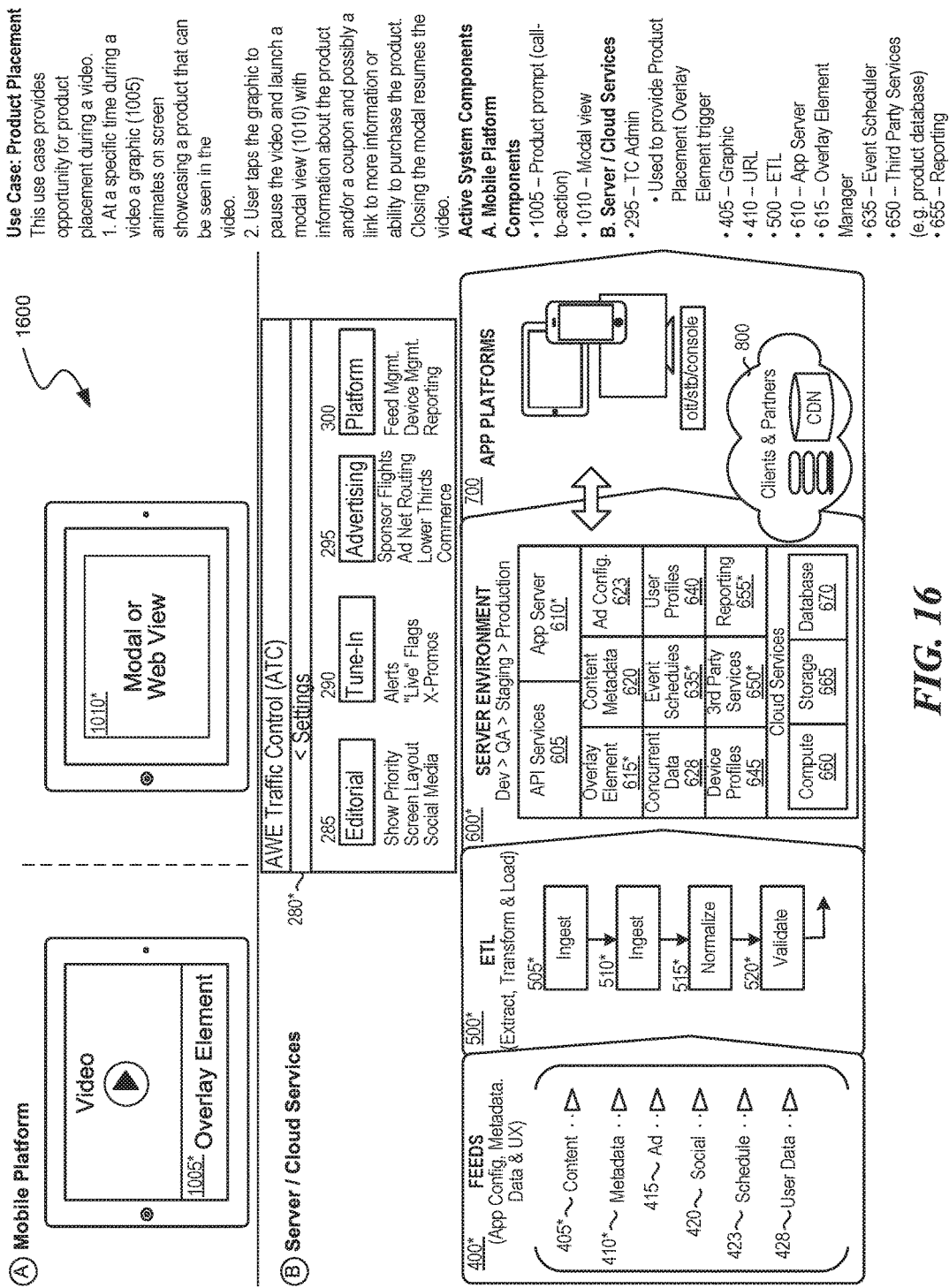
FIG. 16 is a diagram illustrating a product placement use case, consistent with various embodiments.

FIG. 16 is a diagram illustrating a product placement use case, consistent with various embodiments. The product placement use case illustrated can be executed utilizing the various components and modules of system 1600.

Figure 17:
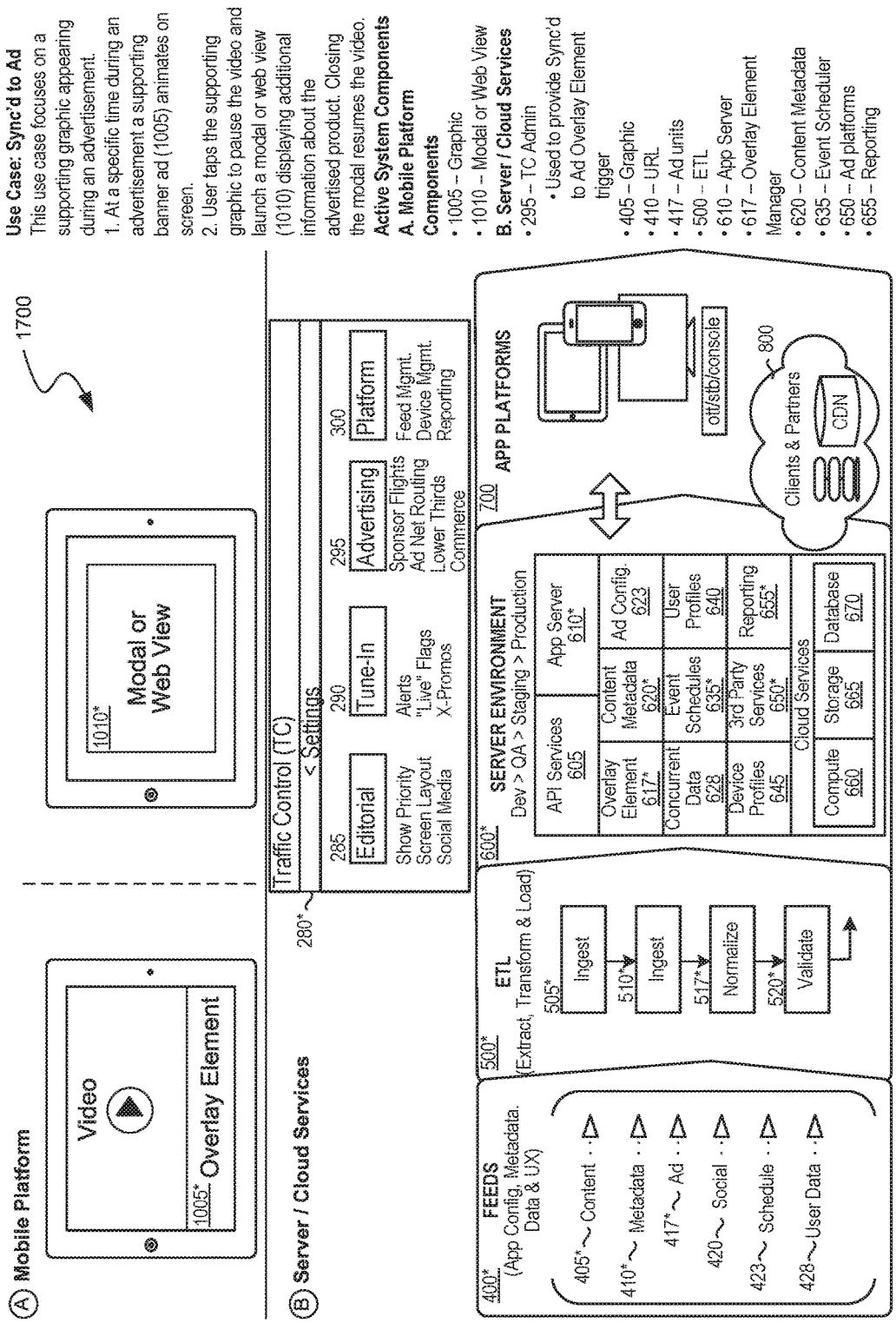
FIG. 17 is a diagram illustrating a sync'd to ad use case, consistent with various embodiments.

FIG. 17 is a diagram illustrating a sync'd to ad use case, consistent with various embodiments. The sync'd to ad use case illustrated can be executed utilizing the various components and modules of system 1700.

Figure 18:
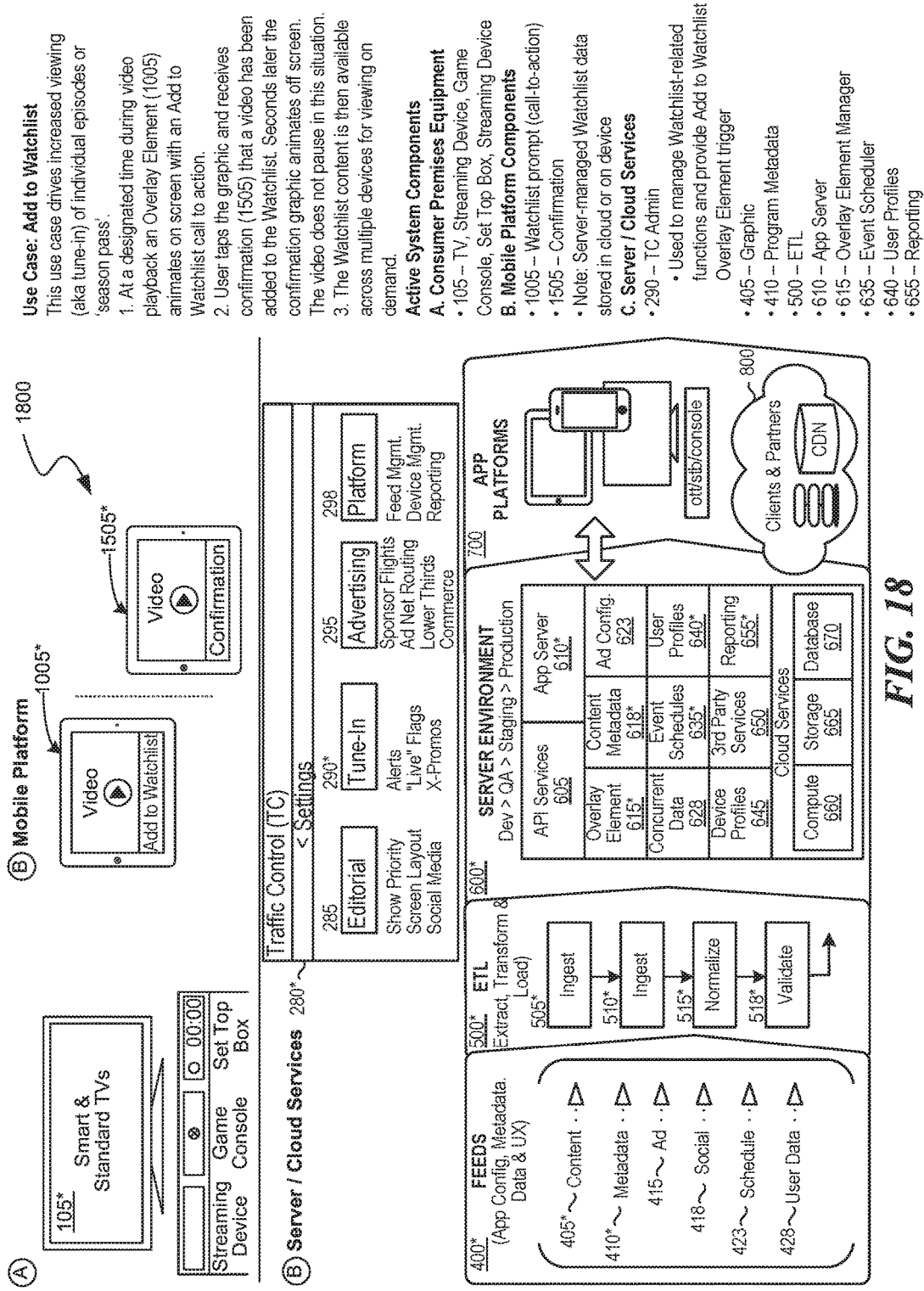
FIG. 18 is a diagram illustrating a add to watchlist use case, consistent with various embodiments.

FIG. 18 is a diagram illustrating a add to watchlist use case, consistent with various embodiments. The add to watchlist use case illustrated can be executed utilizing the various components and modules of system 1800.

Figure 19:
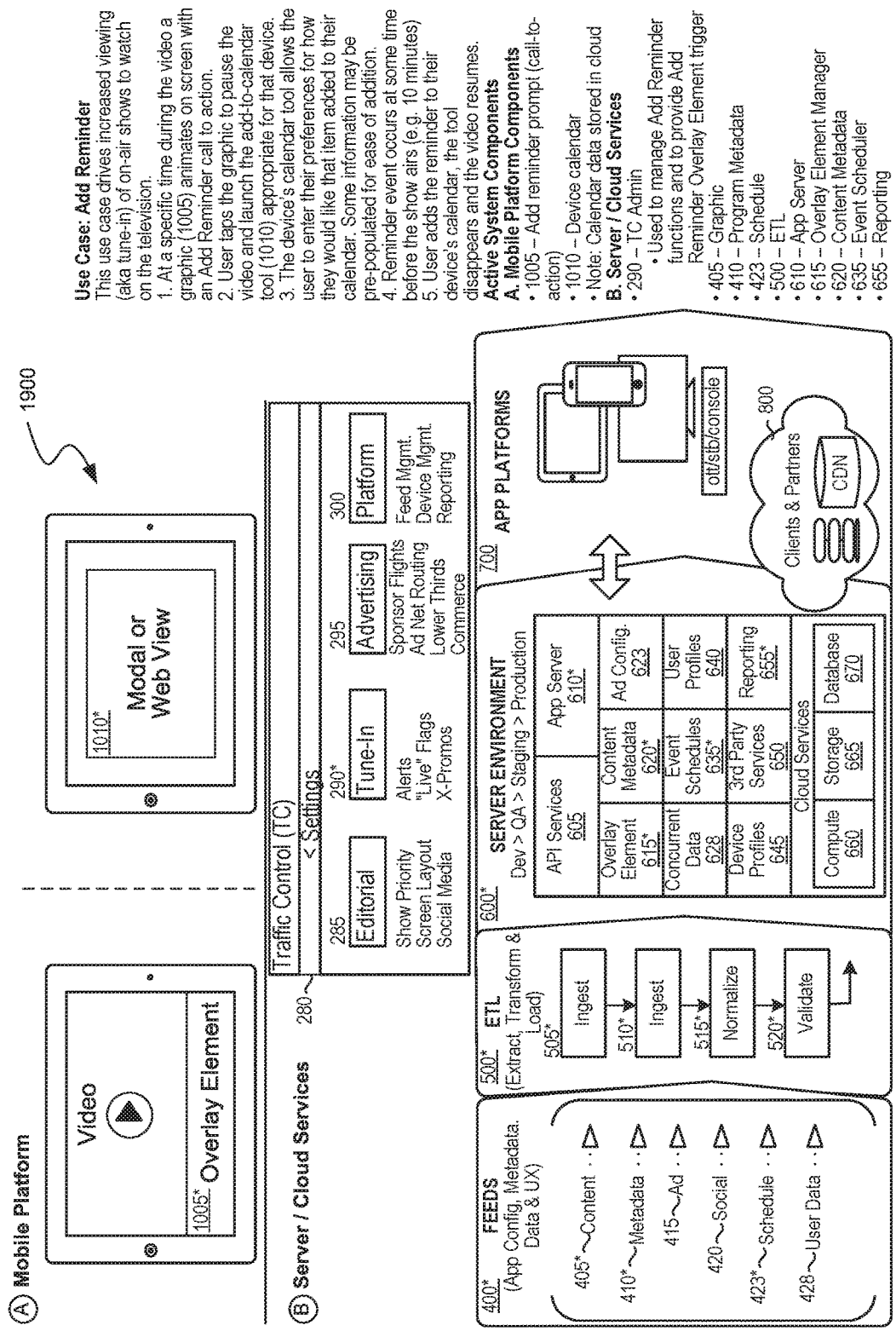
FIG. 19 is a diagram illustrating a add reminder use case, consistent with various embodiments.

FIG. 19 is a diagram illustrating a add reminder use case, consistent with various embodiments. The add reminder use case illustrated can be executed utilizing the various components and modules of system 1900.

Figure 20:
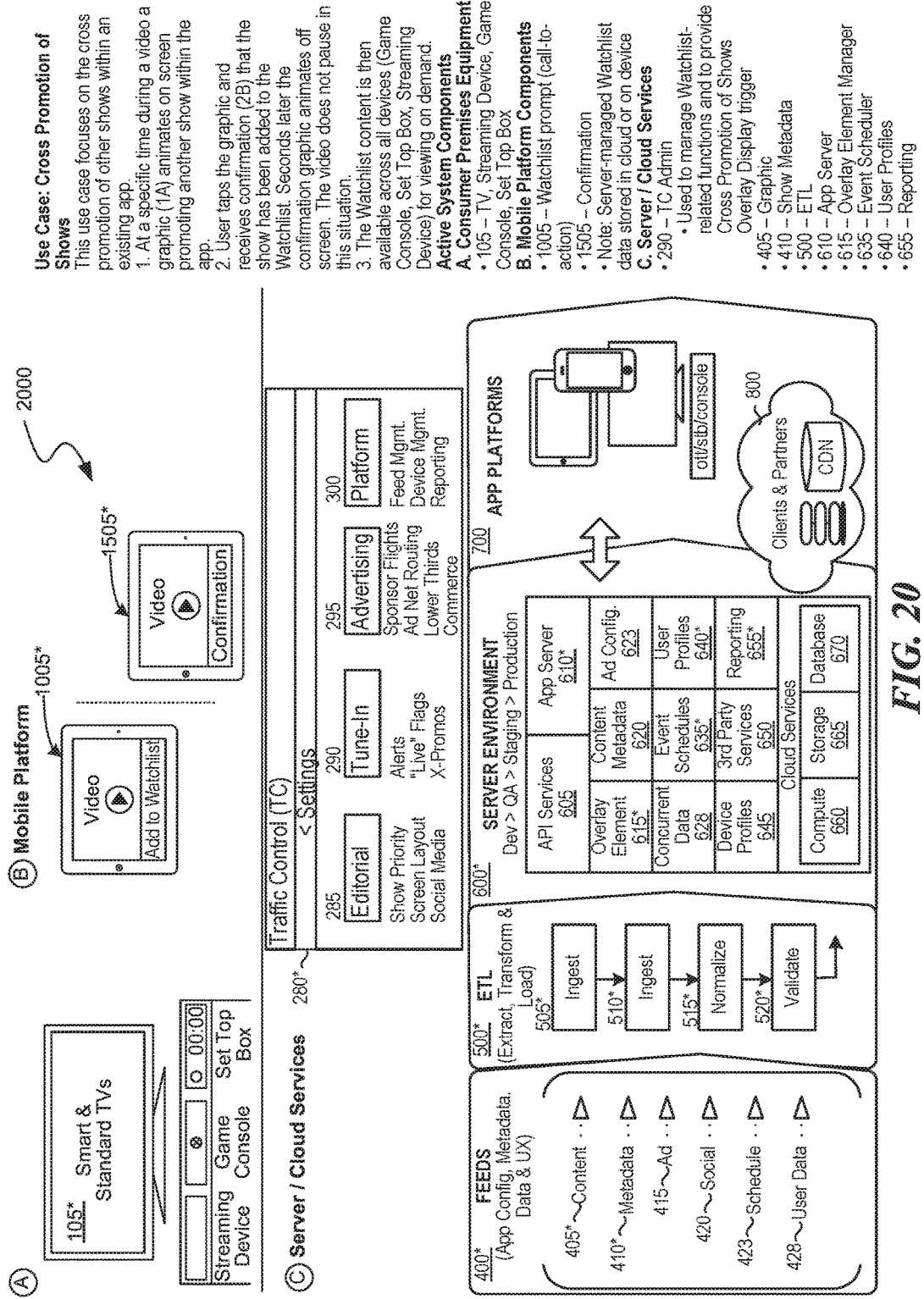
FIG. 20 is a diagram illustrating a cross promotion of shows use case, consistent with various embodiments.

FIG. 20 is a diagram illustrating a cross promotion of shows use case, consistent with various embodiments. The cross promotion of shows use case illustrated can be executed utilizing the various components and modules of system 2000.

Figure 21:
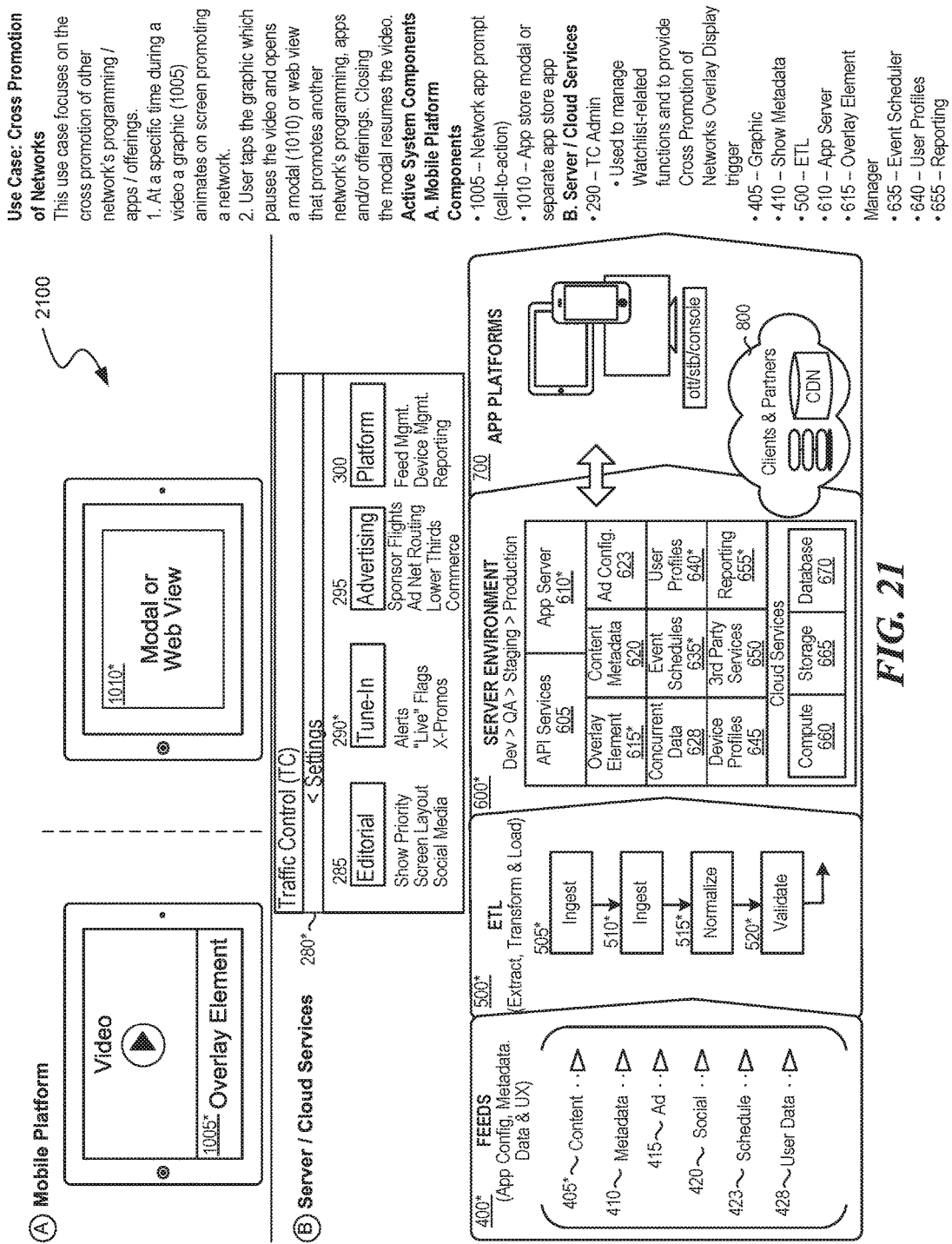
FIG. 21 is a diagram illustrating a cross promotion of networks use case, consistent with various embodiments.

FIG. 21 is a diagram illustrating a cross promotion of networks use case, consistent with various embodiments. The cross promotion of networks use case illustrated can be executed utilizing the various components and modules of system 2100.

Figure 22:
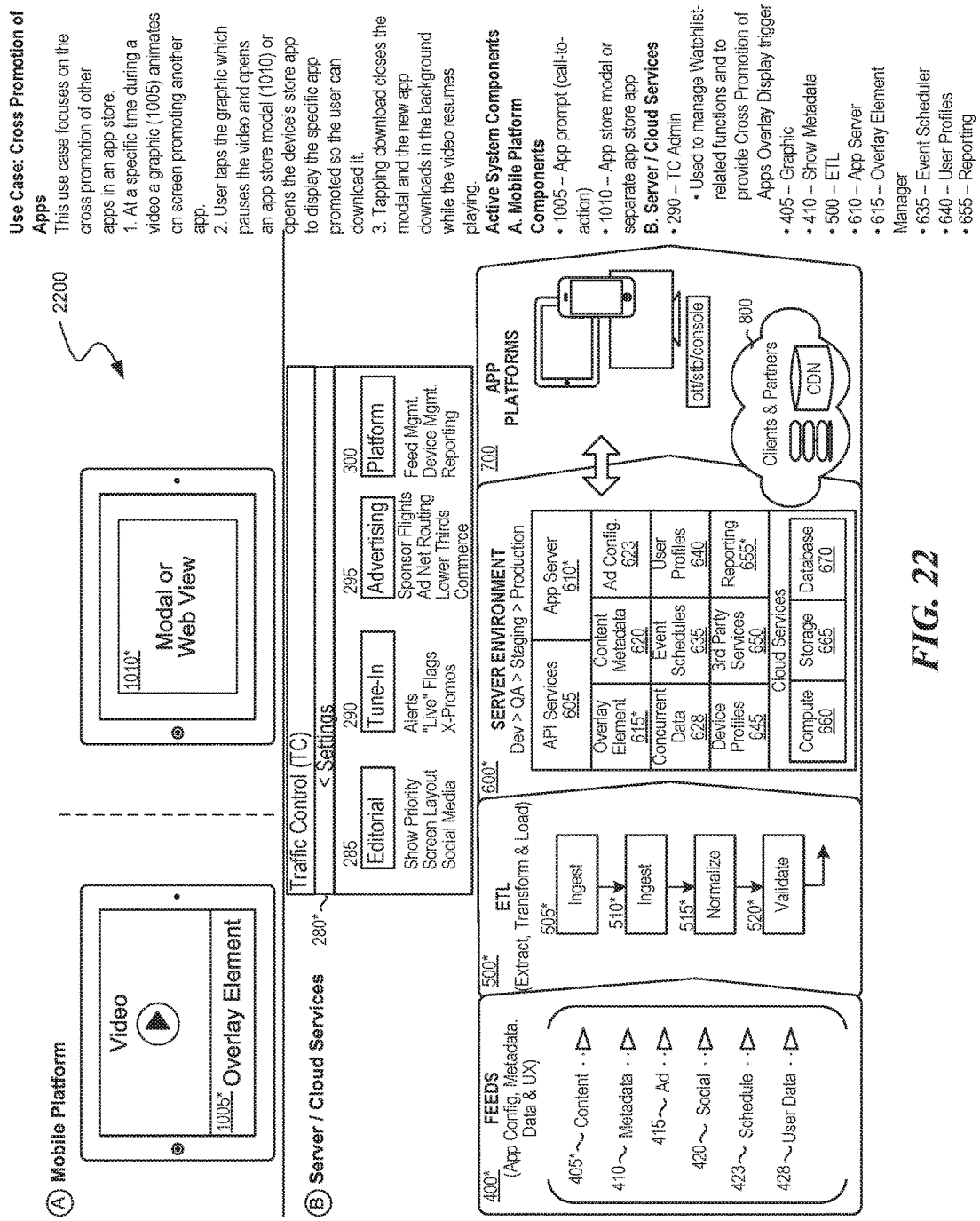
FIG. 22 is a diagram illustrating a cross promotion of applications use case, consistent with various embodiments.

FIG. 22 is a diagram illustrating a cross promotion of applications use case, consistent with various embodiments. The cross promotion of applications use case illustrated can be executed utilizing the various components and modules of system 2200.

Figure 23:
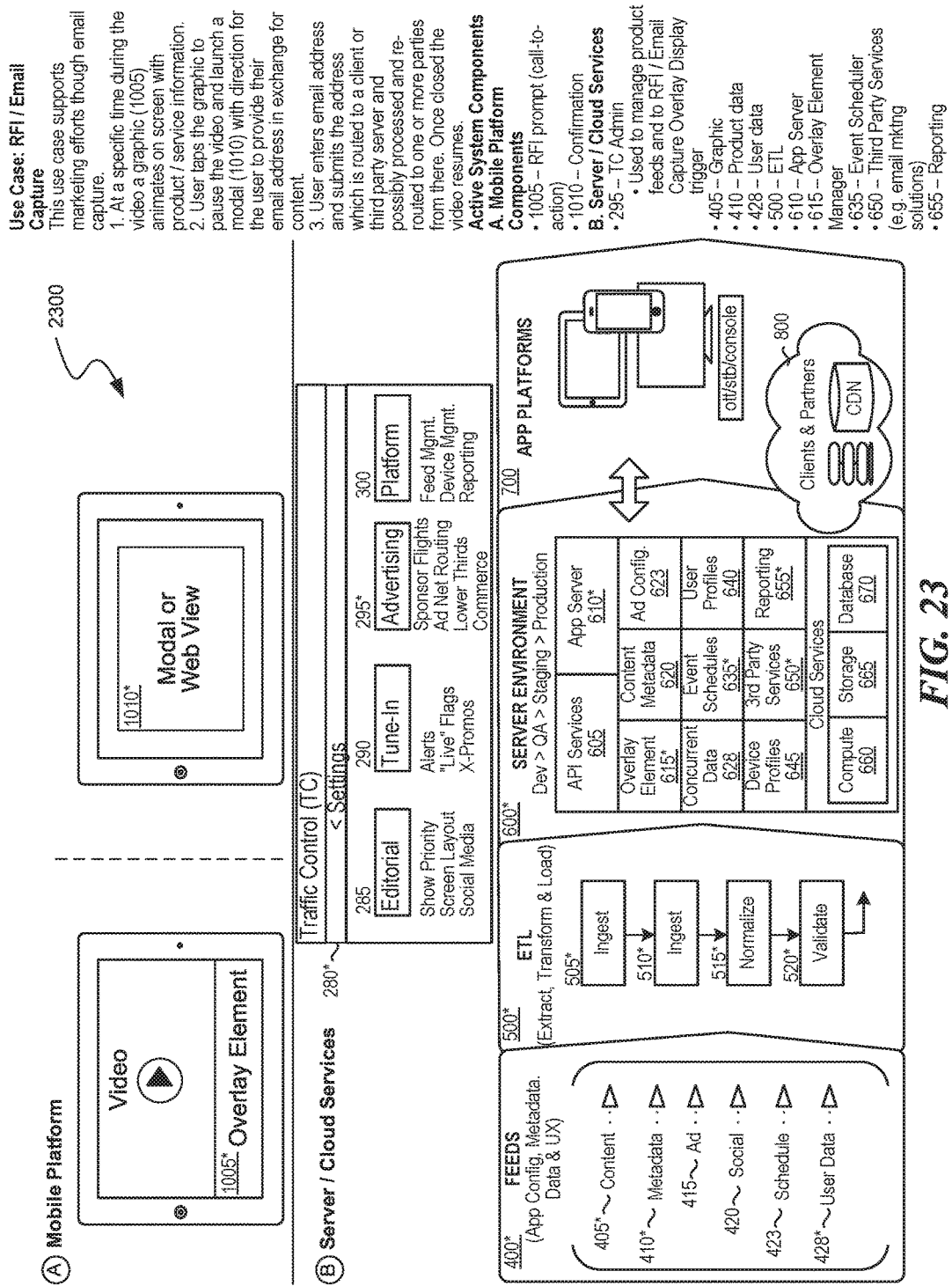
FIG. 23 is a diagram illustrating a request for information (RFI)/email capture use case, consistent with various embodiments.

FIG. 23 is a diagram illustrating a request for information (RFI)/email capture use case, consistent with various embodiments. The RFI/email capture use case illustrated can be executed utilizing the various components and modules of system 2300.

Figure 24:
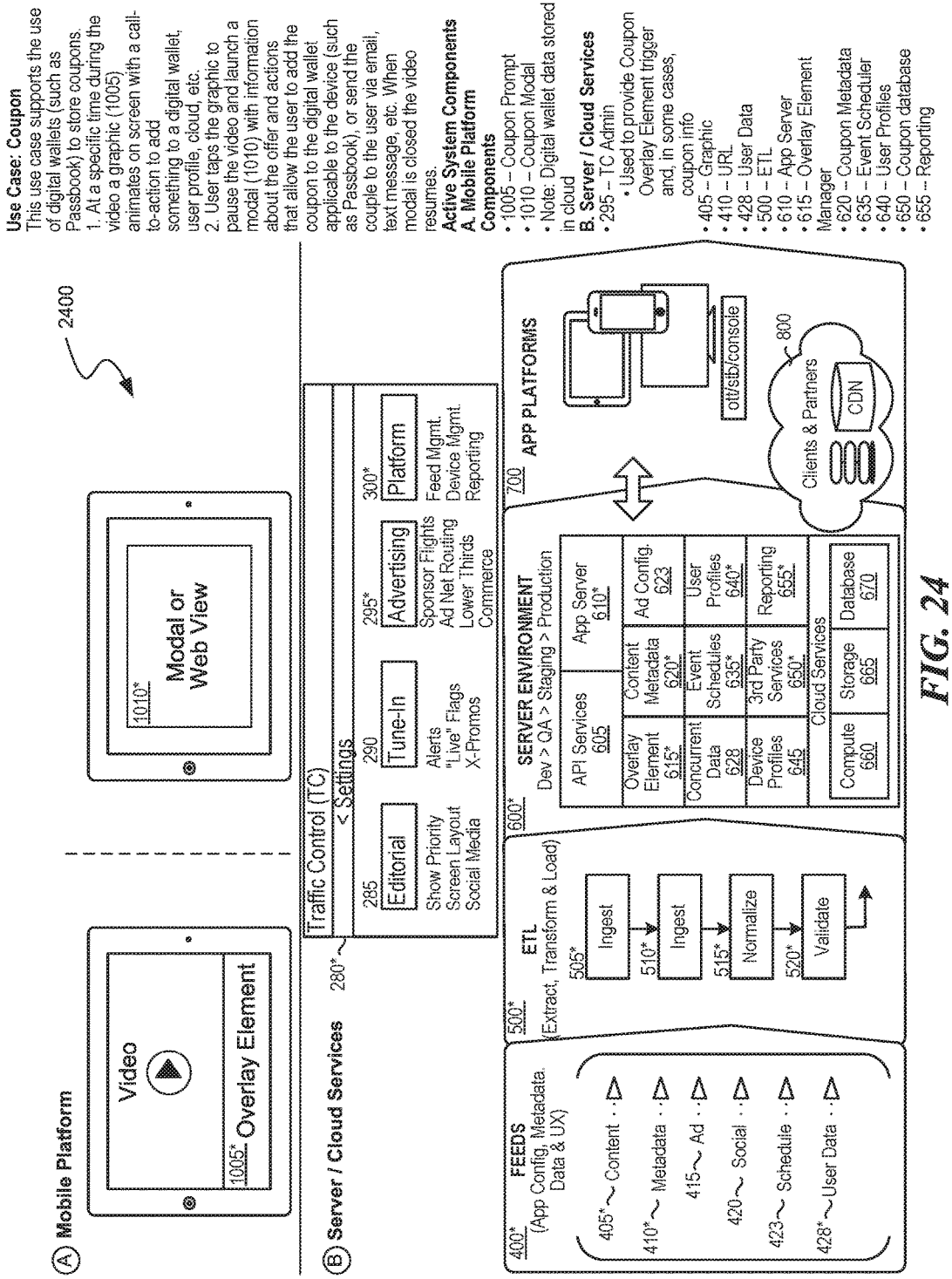
FIG. 24 is a diagram illustrating a coupon use case, consistent with various embodiments.

FIG. 24 is a diagram illustrating a coupon use case, consistent with various embodiments. The coupon use case illustrated can be executed utilizing the various components and modules of system 2400.

Figure 25:
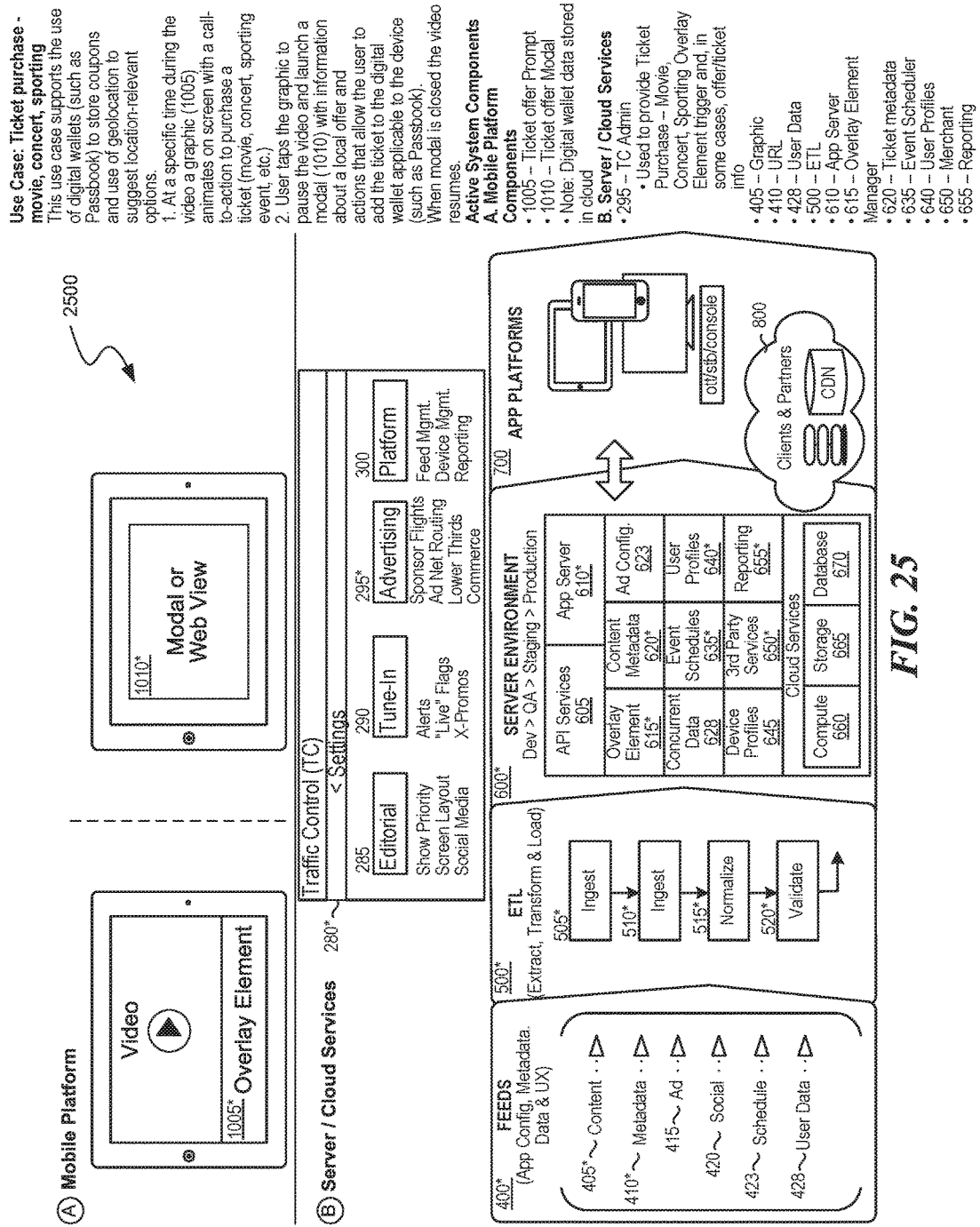
FIG. 25 is a diagram illustrating a movie, concert, sporting event, etc. ticket purchase use case, consistent with various embodiments.

FIG. 25 is a diagram illustrating a movie, concert, sporting event, etc. ticket purchase use case, consistent with various embodiments. The movie, concert, sporting event, etc. ticket purchase use case illustrated can be executed utilizing the various components and modules of system 2400.

Figure 26:
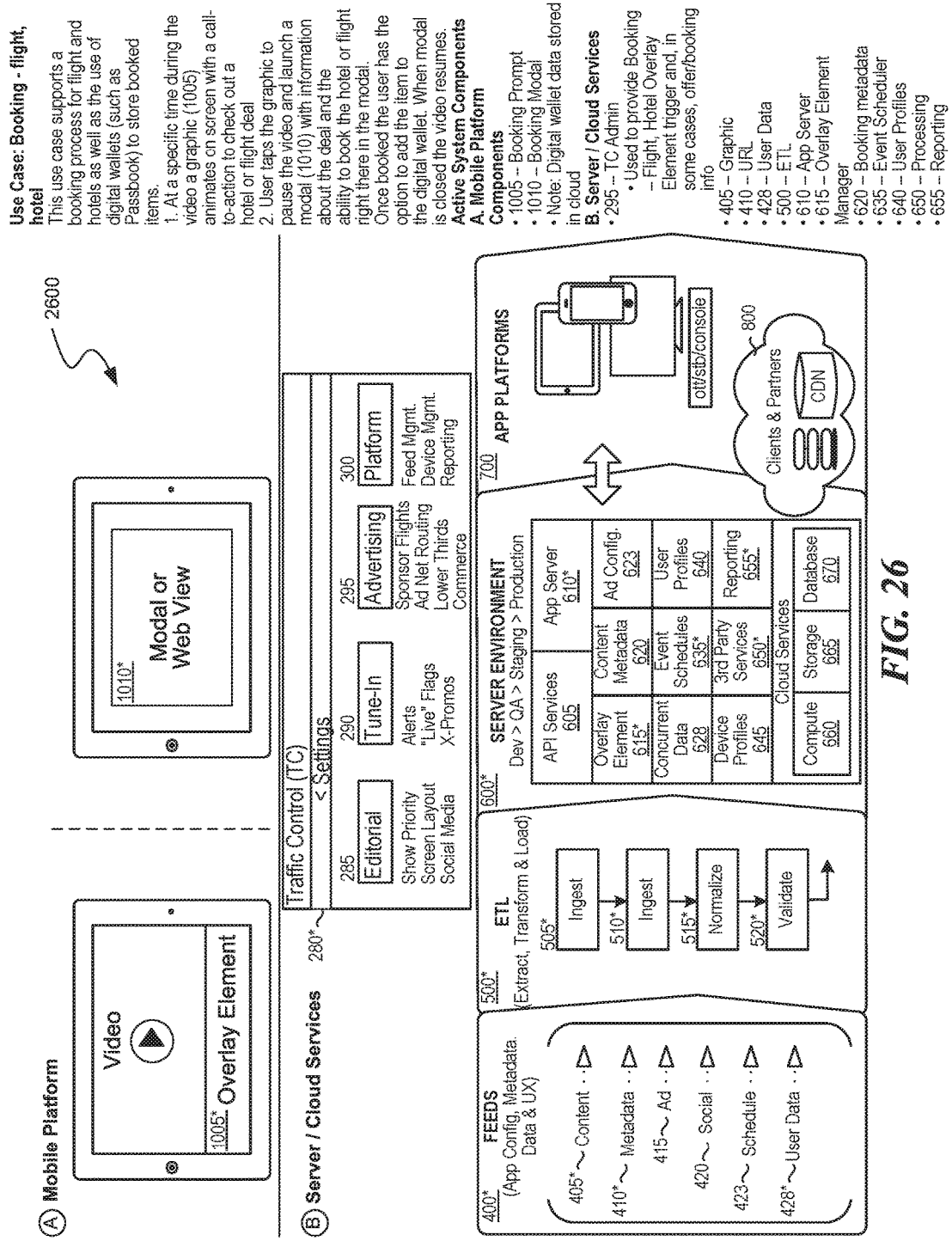
FIG. 26 is a diagram illustrating a flight, hotel, etc. booking use case, consistent with various embodiments.

FIG. 26 is a diagram illustrating a flight, hotel, etc. booking use case, consistent with various embodiments. The flight, hotel, etc. booking use case illustrated can be executed utilizing the various components and modules of system 2600.

Figure 27:
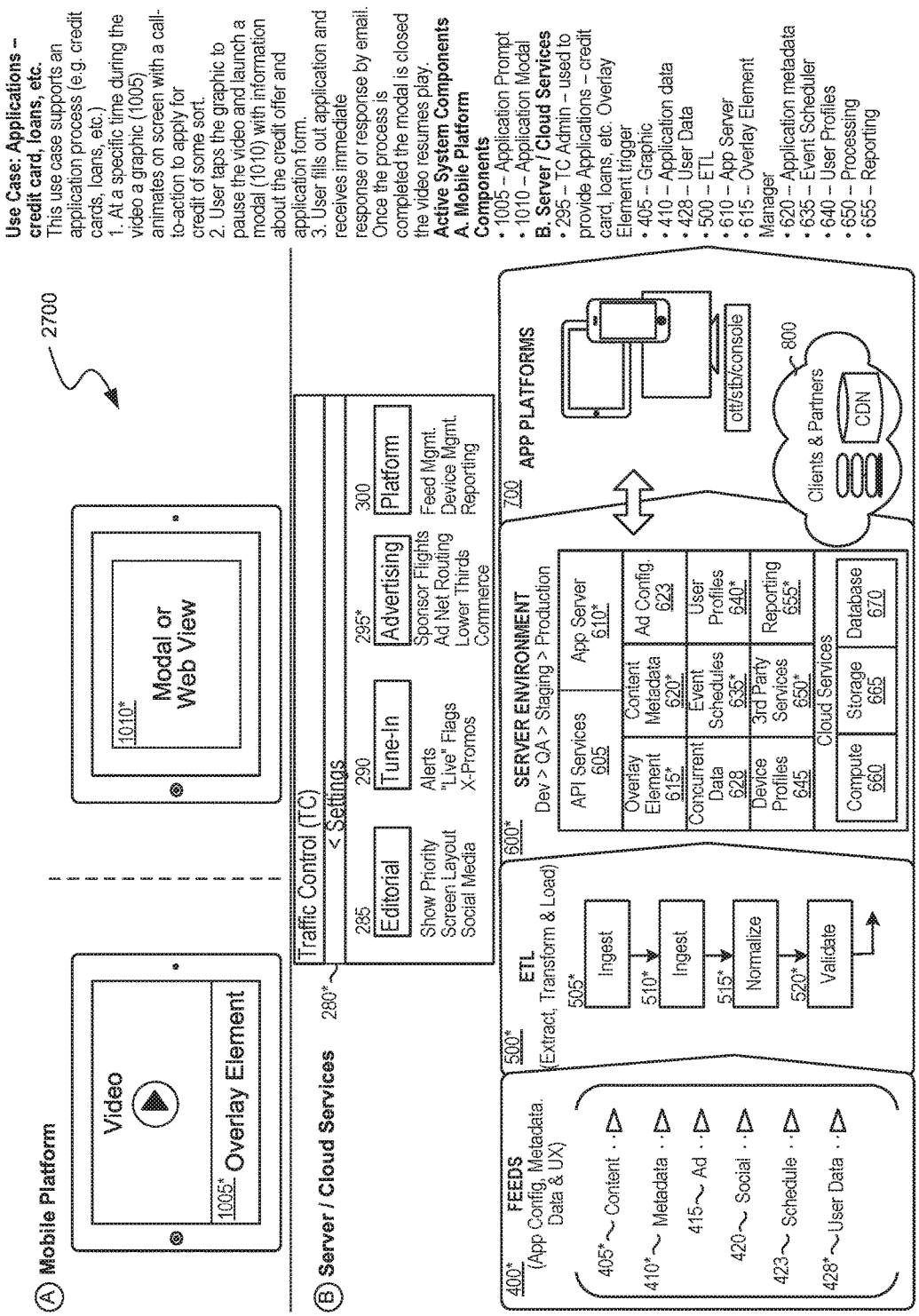
FIG. 27 is a diagram illustrating a credit card, loan, etc. application use case, consistent with various embodiments.

FIG. 27 is a diagram illustrating a credit card, loan, etc. application use case, consistent with various embodiments. The credit card, loan, etc. application use case illustrated can be executed utilizing the various components and modules of system 2700.

Figure 28:
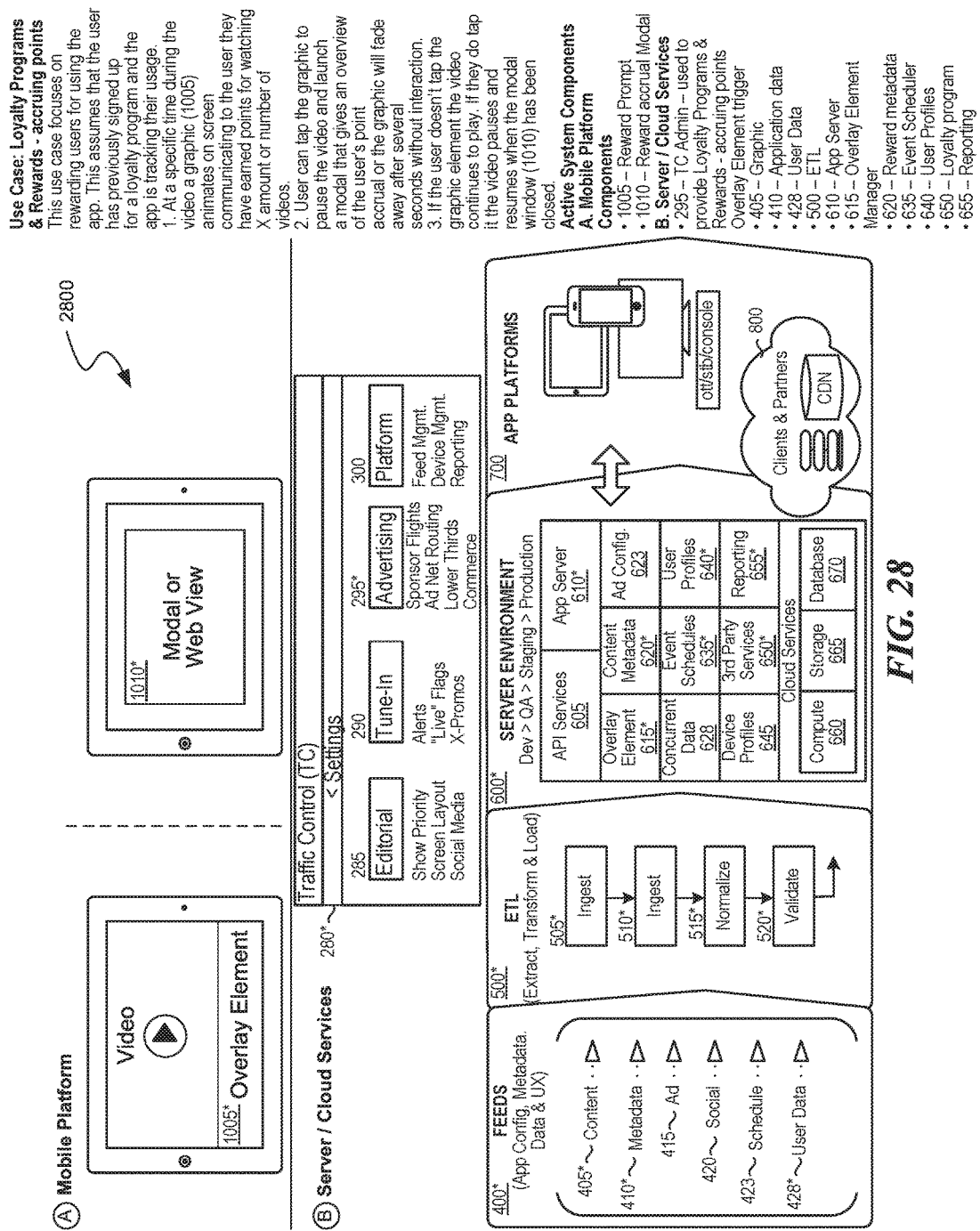
FIG. 28 is a diagram illustrating a accruing points for a loyalty/rewards program use case, consistent with various embodiments.

FIG. 28 is a diagram illustrating a accruing points for a loyalty/rewards program use case, consistent with various embodiments. The accruing points for a loyalty/rewards program use case illustrated can be executed utilizing the various components and modules of system 2800.

Figure 29:
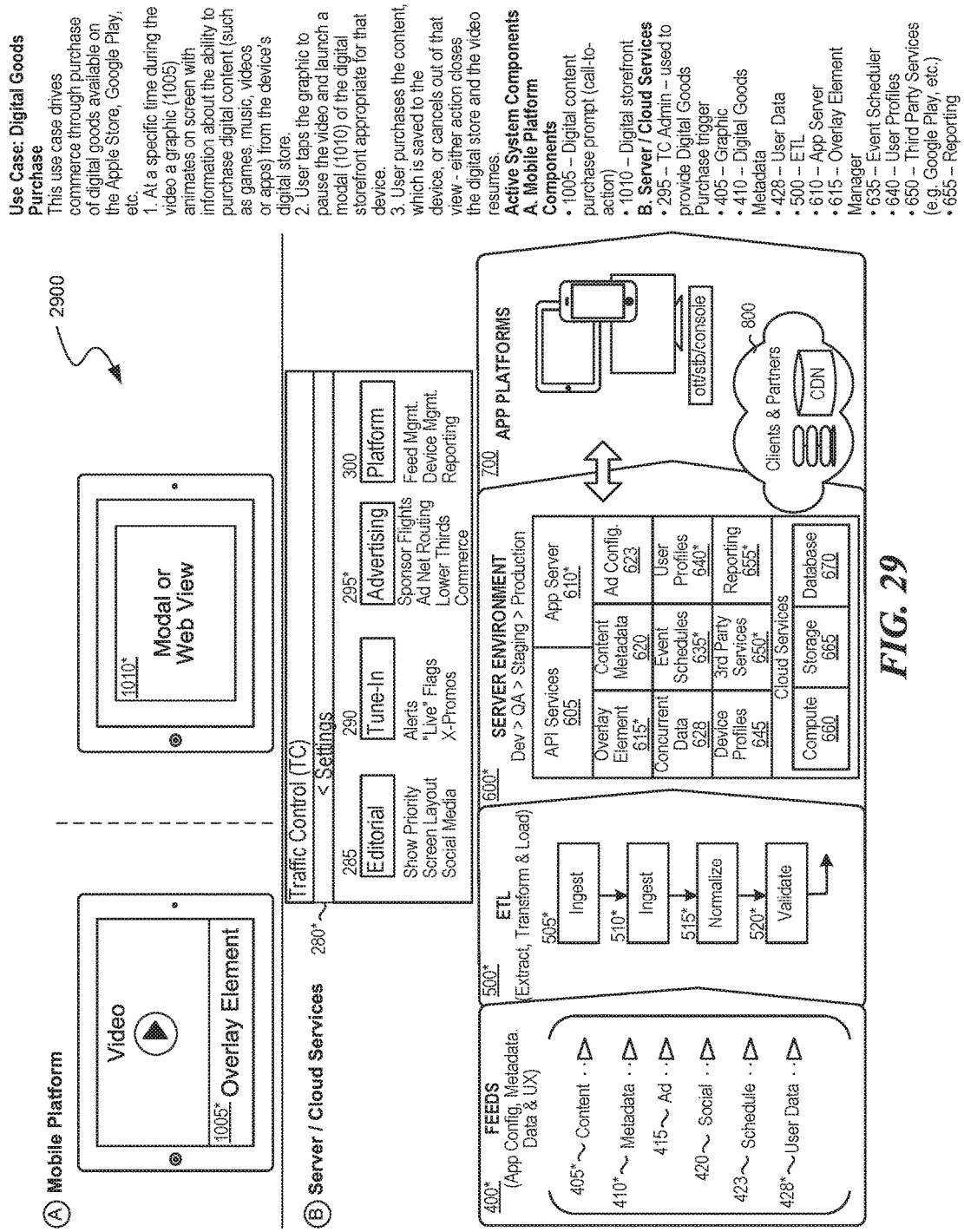
FIG. 29 is a diagram illustrating a digital goods purchase use case, consistent with various embodiments.

FIG. 29 is a diagram illustrating a digital goods purchase use case, consistent with various embodiments. The digital goods purchase use case illustrated can be executed utilizing the various components and modules of system 2900. In addition to the capabilities described on FIG. 29, an overlay display can communicate a time based offer. The amount of time that a user has to take advantage of the offer can be from when the time based offer is first displayed in a video till the end of the video. Touching the overlay display can launch a redeem display that enables the user to redeem the offer. The redeem display could be a persistent overlay display, or other type of display, that stays in place until the offer is taken, or the end of the video is reached and the offer resultantly expires. A time based offer can be extended for items other than digital goods purchases. For example, it can be extended for a physical goods purchase, a coupon offer, an offer to purchase a ticket for an event, an offer for a hotel/airline/etc., etc.

Figure 30:
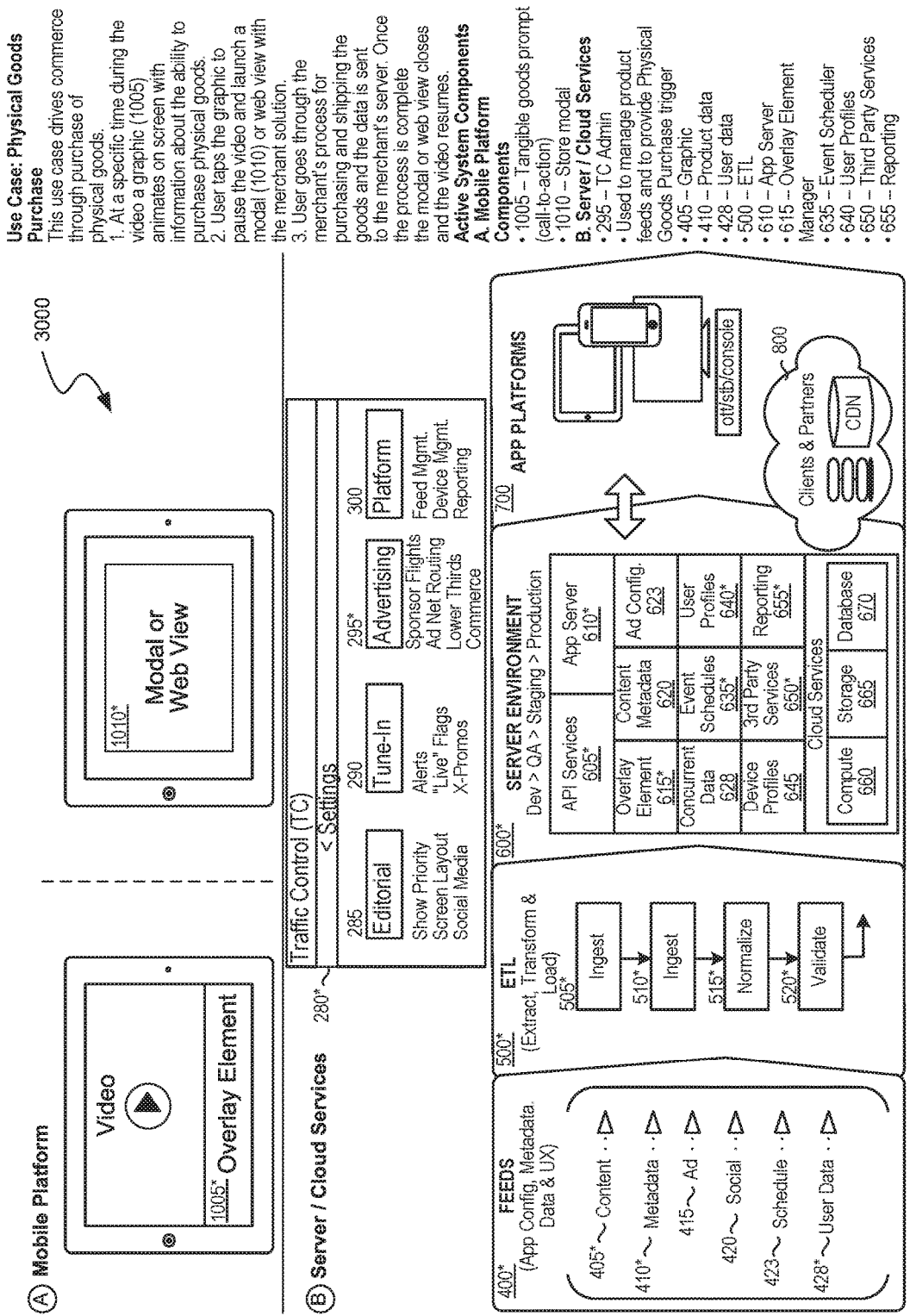
FIG. 30 is a diagram illustrating a physical goods purchase use case, consistent with various embodiments.

FIG. 30 is a diagram illustrating a physical goods purchase use case, consistent with various embodiments. The physical goods purchase use case illustrated can be executed utilizing the various components and modules of system 3000. In addition to the capabilities described on FIG. 30, a user can touch an overlay display to pause the video and purchase a good, such as a pizza. A context relevant module can display contextually relevant information related to the good, such as a pizza order module can display a screen listing local pizza delivery services. After selecting a service, the menu of the service can be displayed, enabling the user to select the pizza or other items that he desires. The pizza can be purchased, and the display of the video resumed.

Figure 31:
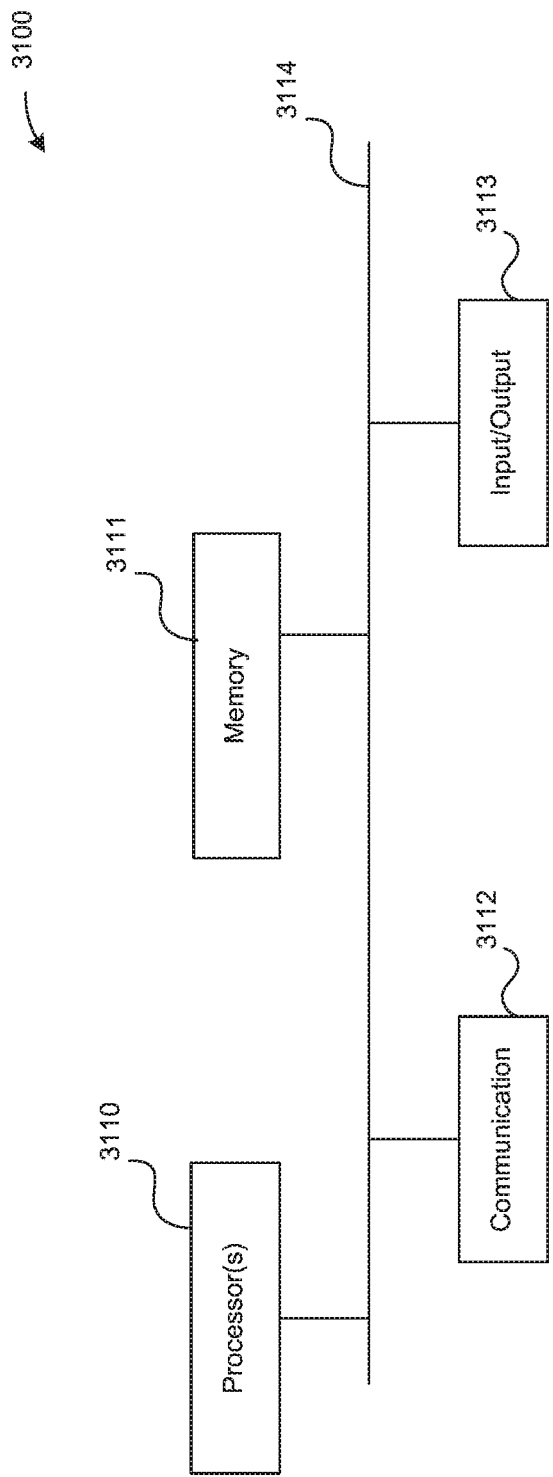
FIG. 31 is a high-level block diagram showing an example of processing system in which at least some operations described in the descriptions of the above figures can be implemented.

FIG. 31 is a high-level block diagram showing an example of a processing device 3100 that can represent any of the devices described above, such as the TV, streaming device, game console, or set top box of media center 105, internet enabled device 115, the servers or other computing devices that are part of interactive watching environment 120 or third party platform 125, server 220, the application platforms of application platforms 225, a server of server environment 600, the application platforms of application platforms 700, a server or other computing device that is part of clients and partners 800, or internet enabled device 1005 or 1010. Any of these systems may include two or more processing devices, such as represented in FIG. 31, which may be coupled to each other via a network or multiple networks.

In the illustrated embodiment, the processing system 3100 includes one or more processors 3110, memory 3111, a communication device 3112, and one or more input/output (I/O) devices 3113, all coupled to each other through an interconnect 3114. In some embodiments, the processing system 3100 may not have any I/O devices 3113. The interconnect 3114 may be or include one or more conductive traces, buses, point-to-point connections, controllers, adapters and/or other conventional connection devices. The processor(s) 3110 may be or include, for example, one or more general-purpose programmable microprocessors, microcontrollers, application specific integrated circuits (ASICs), programmable gate arrays, or the like, or a combination of such devices. The processor(s) 3110 control the overall operation of the processing device 3100. Memory 3111 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 3111 may store data and instructions that configure the processor(s) 3110 to execute operations in accordance with the techniques described above. The communication device 3112 may be or include, for example, an Ethernet adapter, cable modem, Wi-Fi adapter, cellular transceiver, Bluetooth transceiver, or the like, or a combination thereof. Depending on the specific nature and purpose of the processing device 3100, the I/O devices 3113 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for providing an interactive video watching experience to a user, the method comprising:

causing, by a server, a video to be played on a display screen of an internet enabled device associated with the user;

sending, by the server, a trigger of a plurality of triggers associated with the video to the internet enabled device, the trigger being associated with a display element of a plurality of display elements, and with an event that occurs at a specific point of the video, the event being one of a plurality of events that occur in the video, the trigger being created by a traffic controller configured to schedule and manage video content, wherein the trigger is inserted based upon any of video priority, screen layout, and social media data, the trigger being validated to ensure correct syntax and availability of the associated display element, and each of the plurality of triggers being associated with at least one of the display elements, and with at least one of the events;

the display element being a display template configured to be used by a device in association with generating an overlay display to be displayed over the video on a portion of the display screen as the video is being displayed on the display screen, the trigger configured to cause the overlay display to be displayed on the display screen in response to the specific point of the video being reached as the video is being displayed on the display screen;

receiving, by the server, an input indication message sent by the internet enabled device in response to the internet enabled device receiving an indication that the user provided input to the internet enabled device while the overlay display and the video were being displayed on the display screen; and in response to receiving the input indication message indicating that the user provided input to the internet enabled device while the overlay display and the video were being displayed on the display screen, causing, by the server, feed data from a feed to be sent to the internet enabled device to enable the internet enabled device to display a modal view, the modal view containing data based on the feed data.

2. The method of claim 1, wherein the feed data is one or more of: an URL associated with the video, an IP address to data associated with the video, another video, an advertisement, a meta-data associated with the video, a title associated with the video, a description associated with the video, a list of cast members associated with the video, an user-related information related to a social media or a social network account of the user, a schedule data related to programming of a real-time stream associated with the video, a quiz or a poll associated with the video, and an user profile data of the user.

3. The method of claim 1, wherein the input indication message indicates that the user device detected a touch input from the display screen while the overlay was displayed on the display screen.

4. The method of claim 1, wherein the modal view contains data based on the feed data containing information related to the user's social media account.

5. A method for providing an interactive video watching experience to a user, the method comprising:

causing, by a server, a video to be played on a display screen of a user device associated with the user;

sending, by the server, a trigger indicating a display element and a specific point of the video to the user device, the display element used to generate an overlay to be displayed over the video on a portion of the display screen, and the trigger configured to cause the overlay to be displayed on the display screen in response to playing the specific point of the video on the display screen, the trigger being created by a traffic controller configured to schedule and manage video content, and the trigger being validated to ensure correct syntax and availability of the associated display element;

receiving, by the server, an input indication message sent by the user device in response to the user device detecting that the user provided input to the user device while the overlay was being displayed on the display screen; and sending, by the server, feed data to the user device to enable the user device to display a modal view on the display screen in response to receiving the input indication message, the modal view containing data based on the feed data.

6. The method of claim 5, wherein the feed data is one or more of: an URL associated with the video, an IP address to data associated with the video, another video, an advertisement, a meta-data associated with the video, a title associated with the video, a description associated with the video, a list of cast members associated with the video, an user-related information related to a social media or a social network account of the user, a schedule data related to programming of a real-time stream associated with the video, a quiz or a poll associated with the video, and an user profile data of the user.

7. The method of claim 5, wherein when the feed data is a uniform resource locator (URL) or an internet protocol (IP) address of a second feed, the display data is based on the second feed received by the internet enabled device.

8. The method of claim 5, wherein the input indication message indicates that the user device detected a touch input from the display screen while the overlay was displayed on the display screen.

9. The method of claim 5, wherein the modal view contains data based on the feed data containing information related to the user's social media account.

10. The method of claim 5, wherein the specific point in the video indicates one or more of the following: a point in the video when a cast member of a program or movie of the video appears in the video, a point when a commercial appears in the video, a point when a commercial from a company appears in the video, a point when a commercial about a product appears in the video, and a point when the program or the movie of the video begins or ends.

11. The method of claim 5, wherein the overlay includes information regarding a program, the method further comprising:
sending, by the server, a record message to cause the program to be recorded, the record message being sent in response to receiving the input indication message when the overlay includes information about the program.

12. A method for providing an interactive video watching experience to a user, the method comprising:
causing, by a server, a video to be played on a display screen of a user device associated with the user;
sending, by the server, a trigger indicating a display element and a specific point of the video to the user device,
the display element used to generate an overlay to be displayed over the video on a portion of the display screen, and
the trigger configured to cause the overlay to be displayed on the display screen in response to playing the specific point of the video on the display screen, the trigger being created by a traffic controller configured to schedule and manage video content, and the trigger being validated to ensure correct syntax and availability of the associated display element;
receiving, by the server, an input indication message sent by the user device in response to the user device detecting that the user touched the display screen while the overlay was being displayed on the display screen; and
sending, by the server, feed data to the user device to enable the user device to display a modal view on the display screen in response to receiving the input indication message, the modal view containing data based on the feed data.

13. The method of claim 12, wherein the feed data is one or more of: an URL associated with the video, an IP address to data associated with the video, another video, an advertisement, a meta-data associated with the video, a title associated with the video, a description associated with the video, a list of cast members associated with the video, an user-related information related to a social media or a social network account of the user, a schedule data related to programming of a real-time stream associated with the video, a quiz or a poll associated with the video, and an user profile data of the user.

14. The method of claim 12, wherein the modal view contains data based on the feed data containing information related to the user's social media account.

15. A method for providing an interactive video watching experience to a user, the method comprising:
causing, by a server, a video to be played on a display screen of a user device associated with the user;
sending, by the server, a trigger indicating a display element and a specific point of the video to the user device,
the display element used to generate an overlay to be displayed over the video on a portion of the display screen, and
the trigger configured to cause the overlay to be displayed on the display screen in response to playing the specific point of the video on the display screen, the trigger being created by a traffic controller configured to schedule and manage video content, and the trigger being validated to ensure correct syntax and availability of the associated display element;
receiving, by the server, an input indication message sent by the user device in response to the user device detecting that the user provided input to the user device while the overlay was being displayed on the display screen; and
sending, by the server, feed data to the user device to enable the user device to display a modal view on the display screen in response to receiving the input indication message, the modal view containing data based on the feed data containing information related to the user's social media account.

16. The method of claim 15, wherein the feed data is one or more of: an URL associated with the video, an IP address to data associated with the video, another video, an advertisement, a meta-data associated with the video, a title associated with the video, a description associated with the video, a list of cast members associated with the video, an user-related information related to a social media or a social network account of the user, a schedule data related to programming of a real-time stream associated with the video, a quiz or a poll associated with the video, and an user profile data of the user.

17. The method of claim 15, wherein the input indication message indicates that the user device detected a touch input from the display screen while the overlay was displayed on the display screen.

18. A device comprising:
a processor; and
a memory, coupled to the processor, having instructions executable by the processor to cause the device to perform operations including:
causing, by the device, a video to be played on a display screen of a user device;
sending, by the device, a trigger indicating a display element and a specific point of the video to the user device,
the display element used to generate an overlay to be displayed over the video on a portion of the display screen, and
the trigger configured to cause the overlay to be displayed on the display screen in response to playing the specific point of the video on the display screen, the trigger being created by a traffic controller configured to schedule and manage video content, and the trigger being validated to ensure correct syntax and availability of the associated display element;
receiving, by the device, an input indication message sent by the user device in response to the user device detecting that the user provided input to the user device while the overlay was being displayed on the display screen; and
sending, by the device, feed data to the user device to enable the user device to display a modal view on the display screen in response to receiving the input indication message, the modal view containing data based on the feed data.

19. The device of claim 18, wherein the feed data is one or more of: an URL associated with the video, an IP address to data associated with the video, another video, an advertisement, a meta-data associated with the video, a title associated with the video, a description associated with the video, a list of cast members associated with the video, an user-related information related to a social media or a social network account of the user, a schedule data related to programming of a real-time stream associated with the video, a quiz or a poll associated with the video, and an user profile data of the user.

20. The device of claim 18, wherein when the feed data is a uniform resource locator (URL) or an internet protocol (IP) address of a second feed, the display data is based on the second feed received by the internet enabled device.

21. The device of claim 18, wherein the input indication message indicates that the user device detected a touch input from the display screen while the overlay was displayed on the display screen.

22. The device of claim 18, wherein the modal view contains data based on the feed data containing information related to the user's social media account.

\* \* \* \* \*